United States Patent
Wilson et al.

(10) Patent No.: US 10,682,572 B2
(45) Date of Patent: Jun. 16, 2020

(54) VIDEO GAME RETICLE

(71) Applicants: Cameron Wilson, Leander, TX (US); Griffin Chambers, Round Rock, TX (US); Myles Conn Dobbs, Round Rock, TX (US)

(72) Inventors: Cameron Wilson, Leander, TX (US); Griffin Chambers, Round Rock, TX (US); Myles Conn Dobbs, Round Rock, TX (US)

(*) Notice: Subject to any disclaimer, the term of this patent is extended or adjusted under 35 U.S.C. 154(b) by 0 days.

(21) Appl. No.: 16/045,138

(22) Filed: Jul. 25, 2018

(65) Prior Publication Data

US 2020/0030699 A1 Jan. 30, 2020

(51) Int. Cl.
| | |
|---|---|
| *A63F 9/00* | (2006.01) |
| *A63F 13/428* | (2014.01) |
| *A63F 13/422* | (2014.01) |
| *A63F 13/58* | (2014.01) |
| *A63F 13/53* | (2014.01) |

(52) U.S. Cl.
CPC .......... *A63F 13/428* (2014.09); *A63F 13/422* (2014.09); *A63F 13/53* (2014.09); *A63F 13/58* (2014.09); *A63F 2300/305* (2013.01)

(58) Field of Classification Search
None
See application file for complete search history.

(56) References Cited

U.S. PATENT DOCUMENTS

| | | | |
|---|---|---|---|
| 6,184,899 B1 | 2/2001 | Akemann | |
| 6,340,330 B1 | 1/2002 | Oishi et al. | |
| 6,544,125 B2 | 4/2003 | Horigami et al. | |
| 6,606,104 B1 | 8/2003 | Kondo et al. | |
| 6,545,661 B1 | 12/2003 | Goschy et al. | |
| 6,666,764 B1 | 12/2003 | Kudo | |
| 7,001,272 B2 | 2/2006 | Yamashita et al. | |
| 7,137,891 B2 * | 11/2006 | Neveu | A63F 13/06 463/31 |
| 7,374,490 B2 | 5/2008 | Tahara et al. | |
| 7,843,429 B2 | 11/2010 | Pryor | |
| 7,922,584 B2 * | 4/2011 | Egashira | A63F 13/10 463/38 |
| 7,946,909 B2 * | 5/2011 | Neveu | A63F 13/06 463/7 |
| 7,976,386 B2 | 7/2011 | Tran | |
| 7,988,558 B2 | 8/2011 | Sato | |
| 8,405,604 B2 | 3/2013 | Pryor et al. | |

(Continued)

*Primary Examiner* — Seng H Lim
(74) *Attorney, Agent, or Firm* — Sean Christian Connolly

(57) ABSTRACT

Disclosed herein are methods for controlling a simulated object in a video game using a rotatable reticle, which allows a player to control the precise angle of an action and to select from a variety of actions, and then adjusts the effectiveness of the selected action based on the quality of the player's use of the reticle. The Video Game Reticle invention comprises a method of generating a symbol comprising a pivot point and a directional pointer, wherein the symbol acts as a dial with directional keys. A left rotational direction control key causes the dial to swing left, and a right rotational direction control key causes the dial to swing right. One or more action keys allow a player to activate an action, once the player decides on the angle of the action; wherein the relative effectiveness of the action is determined by the angle selected by the player.

14 Claims, 30 Drawing Sheets

(56) References Cited

U.S. PATENT DOCUMENTS

| | | |
|---|---|---|
| 8,419,545 B2 | 4/2013 | Yen et al. |
| 8,992,322 B2 | 3/2015 | Endo et al. |
| 9,086,727 B2 | 7/2015 | Tidemand et al. |
| 9,327,191 B2 | 5/2016 | Miyamoto et al. |
| 9,417,761 B2* | 8/2016 | Fujibayashi ............ A63F 13/04 |
| 9,545,571 B2 | 1/2017 | Johnson et al. |
| 10,328,339 B2* | 6/2019 | May ...................... A63F 13/211 |
| 2002/0054018 A1* | 5/2002 | Yamaguchi ............. A63F 13/10 345/157 |
| 2002/0103031 A1* | 8/2002 | Neveu .................... A63F 13/06 463/49 |
| 2003/0063115 A1* | 4/2003 | Kaku .................... G06F 3/0421 715/711 |
| 2003/0073492 A1 | 4/2003 | Tosaki et al. |
| 2004/0048666 A1 | 3/2004 | Bagley et al. |
| 2004/0233223 A1 | 11/2004 | Schkolne et al. |
| 2006/0256072 A1 | 11/2006 | Ueshima et al. |
| 2007/0111779 A1* | 5/2007 | Osnato .................... A63F 13/06 463/16 |
| 2008/0064500 A1 | 3/2008 | Satsukawa et al. |
| 2008/0146302 A1 | 6/2008 | Olsen et al. |
| 2008/0248872 A1 | 10/2008 | Endo |
| 2008/0273755 A1* | 11/2008 | Hildreth ................ G06F 1/1626 382/103 |
| 2009/0058850 A1* | 3/2009 | Fun ........................ A63F 13/06 345/419 |
| 2010/0151948 A1* | 6/2010 | Vance .................... A63F 13/06 463/43 |
| 2010/0160045 A1* | 6/2010 | Yamada .................. A63F 13/02 463/37 |
| 2011/0227871 A1 | 9/2011 | Cannon |
| 2011/0287843 A1* | 11/2011 | Yamada ................ A63F 13/577 463/43 |
| 2012/0308078 A1* | 12/2012 | Fujibayashi ............ A63F 13/04 382/103 |
| 2019/0015739 A1* | 1/2019 | May ...................... A63F 13/211 |

* cited by examiner

VIDEO GAME RETICLE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The present invention is in the technical field of computer graphics. More particularly, the preferred embodiments of the present invention relate generally to animated computer graphics. More particularly, the preferred embodiments of the present invention relate generally to dynamic animated computer graphics. More particularly, the preferred embodiments of the present invention relate generally to dynamic animated computer graphics in video games. More particularly, the preferred embodiments of the present invention relate generally to dynamic animated computer graphics in video games, which are used to control the video game. More particularly, the preferred embodiments of the present invention relate generally to dynamic animated computer graphics in video games, which are used to control virtual objects in a video game. More particularly, the preferred embodiments of the present invention relate generally to dynamic animated computer graphics in video games, which are used to control virtual objects in a video game with more nuanced control and effectiveness. More particularly, the preferred embodiments of the present invention relate generally to rotatable dynamic animated computer graphics in video games, which are used to control virtual objects in a video game with more nuanced control and effectiveness. More particularly, the preferred embodiments of the present invention relate generally to methods for using rotatable dynamic animated computer graphics in video games, which are used to control virtual objects in a video game with more nuanced control and effectiveness.

2. Description of the Related Art

The broad concept of simulating objects in video games is known. However, these inventions usually involve generating a virtual image of the object and may or may not be animated or capable of being manipulated in virtual space.

Simulating swords in video games is also known. These simulated swords are often limited to a few scripted actions and lack subtlety and nuanced action that is experienced with real life sword fighting.

It is also known to simulate actions in video games. However, as with the simulated sword, these actions are often limited to a few scripted animations that lack a spectrum of varying degrees of effectiveness of the action.

Controlling objects in video games is also known; however, the control of the virtual object is usually limited to a set of scripted actions that lack variation in the quality of control of the object.

It is also known to control simulated swords in video games. However, as with the simulated sword and the control of objects in video games, the control of simulated swords is often limited to a set of discrete animations that lack nuanced control over the sword and the swinging nature of actual sword use.

It is also known to control objects using reticles in video games. However, these reticles are usually used for simple targeting, such as the crosshairs within the simulated scope of virtual rifles, and lack degrees of varying control.

Nuanced control in video games is known, as well. However, this nuanced control is usually limited to a larger set of discrete commands that trigger scripted animations and do not use rotating reticles to determine the effectiveness or degree of control.

SUMMARY OF THE INVENTION

As video games and first-person video games grow in popularity, there arises a need to provide a more realistic and nuanced control of the action in the games. The Video Game Reticle invention was developed in part to provide a method for controlling a simulated object in a video game, which allows for nuanced control over the object and provides for nuanced effectiveness of the object based on its nuanced control.

In broad embodiment, the Video Game Reticle invention relates to a method for controlling a simulated tool or weapon in a first-person or third-person video game, such as a virtual sword, using a reticle, which allows a player to control the precise angle of an action and to select from a variety of actions, and then displays the effectiveness of the action using the reticle. The Video Game Reticle is most appropriate for simulating action and rendering nuanced control over objects that are meant to be held in a hand and swung in simulated three-dimensional space. The Video Game Reticle invention comprises a method of generating and animating a symbol comprising a pivot point and a directional pointer or elongated line extending from or through the pivot point; wherein the symbol acts as a dial with directional keys. A left rotational direction control key, such as the left mouse key or a video game controller key or the like, causes the dial to swing left, and with a right rotational direction control key, such as the right mouse key or video game controller key or the like, causes the dial to swing right. One or more action keys, comprising keyboard keys or video game controller keys or the like, allow a player to activate an action, such as attacking or defending, once the player decides on the angle of the action; wherein the relative effectiveness of the action is determined by the angle selected by the player. In some embodiments, changing the color of the symbol or a portion of the symbol may indicate the relative effectiveness of the action. The Video Game Reticle is well suited for controlling a simulated handheld weapon, such as a sword, axe, mace, knife, club, spear, or the like; and it is also easily adaptable to control other simulated tools, such as sports equipment, baseball bats, tennis rackets, golf clubs, or the like; or any other object whose effectiveness is determined in part by the angle and direction of its application. In virtual combat against another first-person player or third-person player, such as a virtual sword fight, the other player would also use a Video Game Reticle. In some embodiments, in such virtual combat, the elongated line may correspond to the length of the object being wielded by the player, such as the length of a simulated sword. The rotating portion of the symbol provides a player with 360 degrees of freedom for selecting an angle of an action by using the left and right directional keys, which ordinarily would comprise the left and right mouse keys or the left and right directional indicators in a joy stick of a video game controller, respectively. Once a player selects the angle of an action by rotating the circle and aligning the directional indicator with the angle of the action, the player selects an action key, which ordinarily comprises a key on a standard computer keyboard or a button on a video game controller. For example, in virtual sword combat, a player may choose to block or swing and is provided with a key for blocking and a key for swinging. In this example, an attacking swing is demonstrated by the reticle flashing red, and a defending block is illustrated by the reticle flashing green. The reticle flashing gold demonstrates that the attack landed its blow or that the block was successful. Nuanced effectiveness of an action is determined by the relation of the angle of the action taken to a hypothetical perfect action angle. The closer the angle of the action is to a hypothetical perfect action angle, the more effective the action is performed. The farther the angle of the action is to a hypothetical perfect action angle, the less effective the action is performed. In sum, the Video Game Reticle invention provides an efficient and intuitive solution for the nuanced control of a virtual object in a first-person or third-person video game and allows for nuanced effectiveness of the object based on its nuanced control.

In more preferred embodiments, the present invention relates a method of nuanced control of an action in a video game, said method comprising: providing a simulated video game object for manipulation in said video game; graphically illustrating a reticle in said video game, said reticle comprising a pivot point, and a directional indicator, said direction indicator being rotational around said pivot point and comprising a pointer; rotating said directional indicator around said pivot point until said pointer is at a selected orientation in response to player input, said selected orientation comprising the orientation of said pointer selected by said player; initiating said action in response to said player input; determining the effectiveness of said action by comparing said selected orientation to an optimal orientation, said optimal orientation comprising the orientation for optimizing said action, and reducing said effectiveness proportionately to the degree of variance of said selected orientation from said optimal orientation; configuring said action with said effectiveness; and simulating said action in said video game. In some embodiments, the reticle may change colors based on said effectiveness of said action. The reticle may resembles a hand-held weapon, such as a sword, axe, mace, knife, club, spear, whip, a custom handheld weapon, other simulated handheld weapon, or the like. In sports-related games, the reticle may resemble hand-held sports equipment, such as baseball bats, tennis rackets, golf clubs, or the like.

In other more preferred embodiments, the present invention relates to a method of nuanced control of an action in a video game, said method comprising: providing a simulated video game object for manipulation in said video game; graphically illustrating said simulated video game object in said video game, said simulated video game object comprising a pivot point, and a directional indicator, said direction indicator being rotational around said pivot point and comprising a pointer; rotating said directional indicator around said pivot point until said pointer is at a selected orientation in response to player input, said selected orientation comprising the orientation of said pointer selected by said player; initiating said action in response to said player input; determining the effectiveness of said action by comparing said selected orientation to an optimal orientation, said optimal orientation comprising the orientation for optimizing said action, and reducing said effectiveness proportionately to the degree of variance of said selected orientation from said optimal orientation; configuring said action with said effectiveness; and simulating said action in said video game. In some embodiments, the simulated video game object may change color based on said effectiveness of said action. The simulated video game object may resembles a hand-held weapon, such as a sword, axe, mace, knife, club, spear, whip, a custom handheld weapon, other simulated handheld weapon, or the like. In sports-related games, the simulated video game object may resemble hand-held sports equipment, such as baseball bats, tennis rackets, golf clubs, or the like.

In other more preferred embodiments, the present invention relates to a method of nuanced control of an action in a video game, said video game comprising a viewing window, said method comprising: providing a simulated video game object for manipulation in said video game; graphically illustrating a pointing line in said viewing window of said video game, said pointing line comprising a pivot point, a line extending from the edge of said viewing window of said video game through said pivot point, said line being rotational around said pivot point, and a directional indicator, said direction indicator comprising a pointer; rotating said line around said pivot point until said pointer is at a selected orientation in response to player input, said selected orientation comprising the orientation of said pointer selected by said player; initiating said action in response to said player input; determining the effectiveness of said action by comparing said selected orientation to an optimal orientation, said optimal orientation comprising the orientation for optimizing said action, and reducing said effectiveness proportionately to the degree of variance of said selected orientation from said optimal orientation; configuring said action with said effectiveness; and simulating said action in said video game. In some embodiments, the pointing line may change color based on said effectiveness of said action.

In other more preferred embodiments, the present invention relates to a method of nuanced control of an action in a video game, said video game comprising a viewing window, said method comprising: providing a simulated video game object for manipulation in said video game; graphically illustrating a control line in said viewing window of said video game, said control line comprising a pivot point, and a line extending from the edge of said viewing window of said video game through said pivot point to the opposite edge of said viewing window, said line being rotational around said pivot point; rotating said line around said pivot point until said line is at a selected orientation in response to player input, said selected orientation comprising the orientation of said line selected by said player; initiating said action in response to said player input; determining the effectiveness of said action by comparing said selected orientation to an optimal orientation, said optimal orientation comprising the orientation for optimizing said action, and reducing said effectiveness proportionately to the degree of variance of said selected orientation from said optimal orientation; configuring said action with said effectiveness; and simulating said action in said video game. In some embodiments, the control line may change color based on said effectiveness of said action.

In other more preferred embodiments, the present invention relates to a method of nuanced control of an action in a video game, said video game comprising a viewing window, said method comprising: providing a simulated video game object for manipulation in said video game; graphically illustrating a control line in said viewing window of said video game, said control line comprising a pivot point, a line extending from one edge of said viewing window of said video game through said pivot point to the opposite edge of said viewing window, said line being rotational around said pivot point, and two selectable ends on either end of said line, either said selectable end being able to be selected in response to player input; rotating said line around said pivot point until said line is at a selected orientation in response to said player input, said selected orientation comprising the orientation of said line selected by said player; selecting one said selectable end in response to said player input, said selected selectable end determining the selected direction of said action; initiating said action in response to said player input; determining the effectiveness of said action by comparing said selected orientation to an optimal orientation, said optimal orientation comprising the orientation for optimizing said action; comparing said selected direction to an optimal direction, said optimal direction comprising the direction for optimizing said action; and reducing said effectiveness proportionately to the degree of variance of said selected orientation from said optimal orientation and the variance of said selected direction from said optimal direction; configuring said action with said effectiveness; and simulating said action in said video game. In some embodiments, the control line may change color based on said effectiveness of said action.

In the most preferred embodiments, the present invention relates to a method of nuanced control of an action in a video game, such as an attack or defense, said method comprising: providing a simulated sword object for manipulation in said video game; graphically illustrating a reticle in said video game, said reticle resembling a sword, said reticle comprising a pivot point, and a directional indicator, said direction indicator being rotational around said pivot point and comprising a pointer; rotating said directional indicator around said pivot point until said pointer is at a selected orientation in response to player input, said selected orientation comprising the orientation of said pointer selected by said player; initiating said action in response to said player input; determining the effectiveness of said action by comparing said selected orientation to an optimal orientation, said optimal orientation comprising the orientation for optimizing said action, and reducing said effectiveness proportionately to the degree of variance of said selected orientation from said optimal orientation; configuring said action with said effectiveness; and simulating said action in said video game. In some embodiments, the sword reticle may change colors based on said effectiveness of said action. In sum, the Video Game Reticle provides a sophisticated tool, which provides nuanced control and effectiveness over a simulated video game object.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiments of a Video Game Reticle for controlling a simulated tool or weapon in a first-person or third-person video game, which comprises a symbol comprising a pivot point and a directional pointer that is rotatable around the pivot point, wherein the symbol acts as a dial with keys that control the direction of rotation and activate an action with the relative effectiveness of the action is determined by the orientation selected by the player; a Video Game Reticle for controlling a simulated tool or weapon in a first-person or third-person video game, which comprises the simulated tool or weapon, wherein the simulated tool or weapon uses keys that control the direction of rotation and activate an action with the relative effectiveness of the action is determined by the orientation selected by the player; a Video Game Reticle for controlling a simulated tool or weapon in a first-person or third-person video game, which comprises a symbol comprising a pivot point and a line with a directional indicator extending from the edge of the viewing window of the video game through the pivot point that is rotational around the pivot point, wherein the symbol uses keys that control the direction of rotation and activate an action with the relative effectiveness of the action is determined by the orientation selected by the player; a Video Game Reticle for controlling a simulated tool or weapon in a first-person or third-person video game, which comprises a symbol comprising a pivot point and a line extending from an edge of the viewing window of the video game through the pivot point to the opposite edge of the viewing window that is rotational around said pivot point, wherein the symbol uses keys that control the direction of rotation and activate an action with the relative effectiveness of the action is determined by the orientation selected by the player; and a Video Game Reticle for controlling a simulated tool or weapon in a first-person or third-person video game, which comprises a symbol comprising a pivot point and a line with two selectable ends extending from an edge of the viewing window of the video game through the pivot point to the opposite edge of the viewing window that is rotational around said pivot point, wherein the symbol uses keys that control the direction of rotation, select an end for the direction of the action, and activate an action with the relative effectiveness of the action is determined by the orientation and direction end selected by the player. These embodiments are exemplary and not intended to limit the scope of the present invention.

Figure 1:
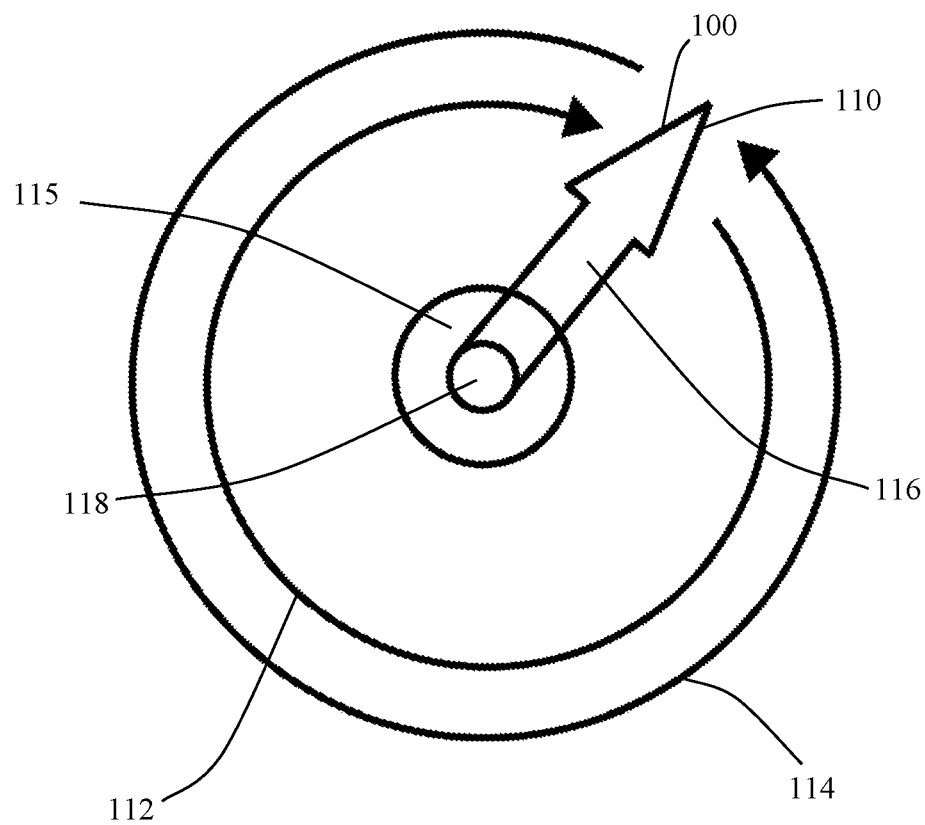
FIG. 1 is a view of a preferred embodiment of a reticle of the present invention.
Figure 2:
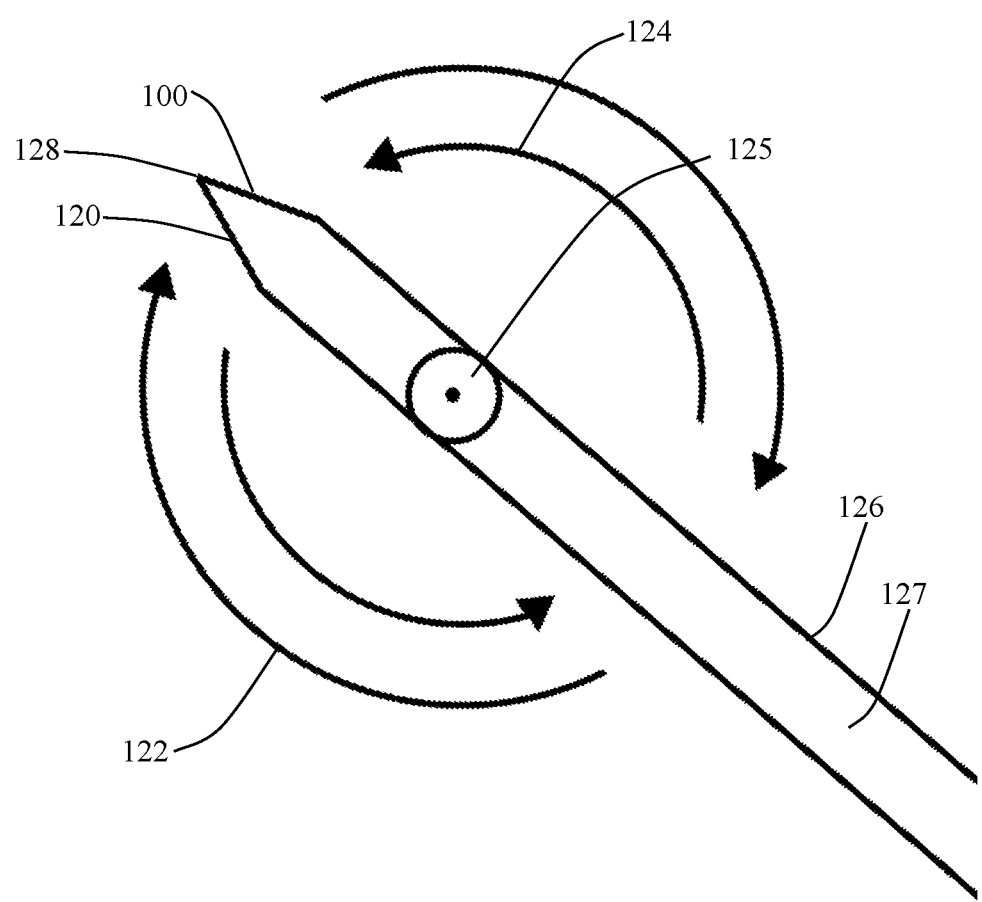
FIG. 2 is a view of another preferred embodiment of a reticle of the present invention.
Figure 3:
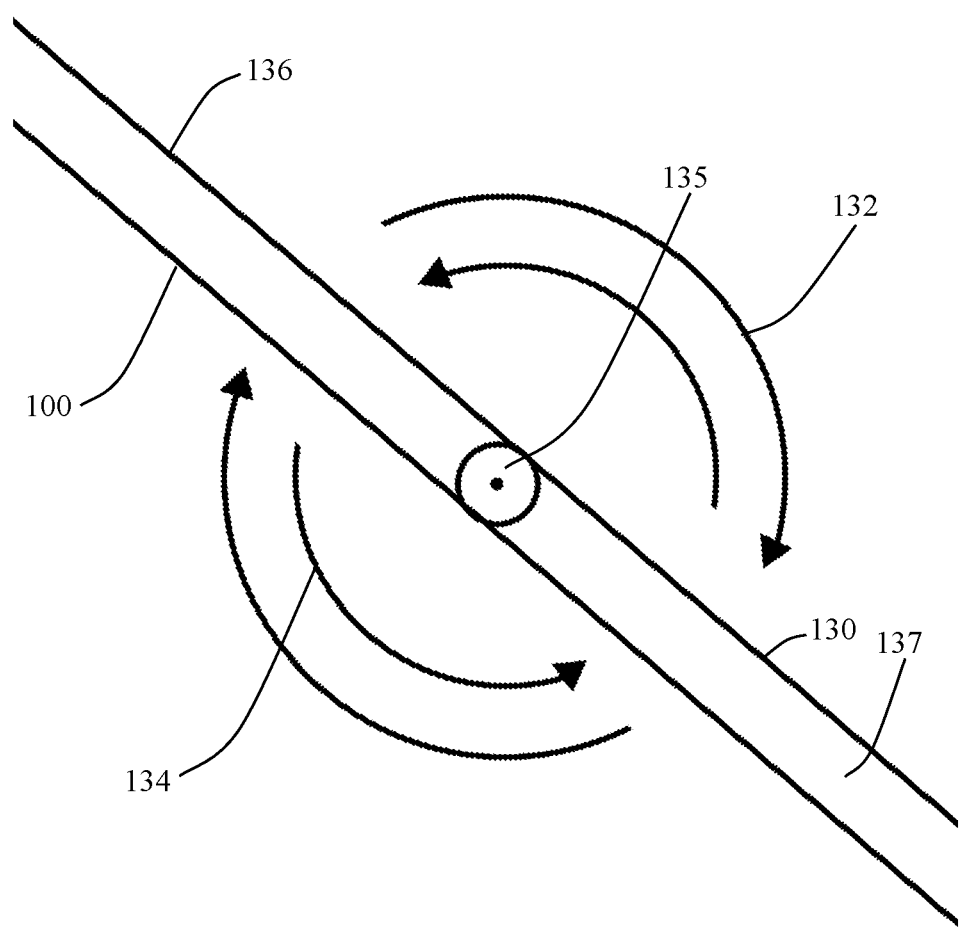
FIG. 3 is a view of another preferred embodiment of a reticle of the present invention.
Figure 4:
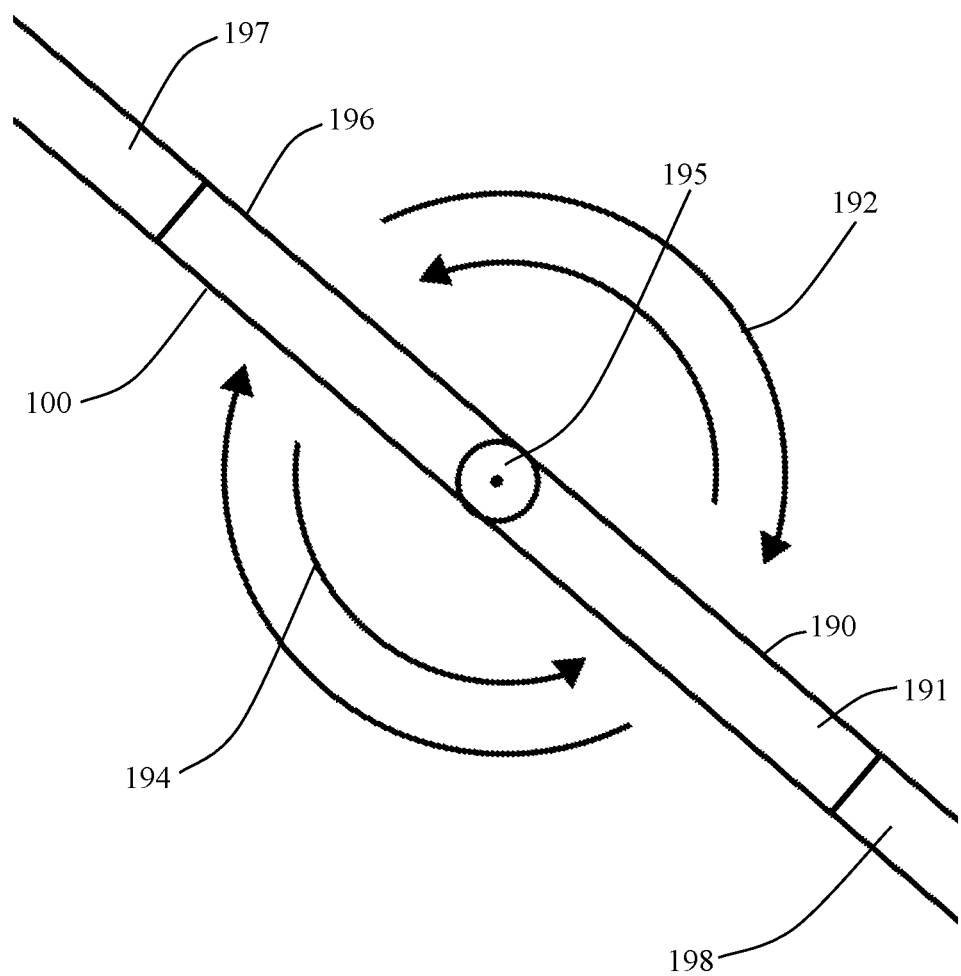
FIG. 4 is a view of another preferred embodiment of a reticle of the present invention.
Figure 5:
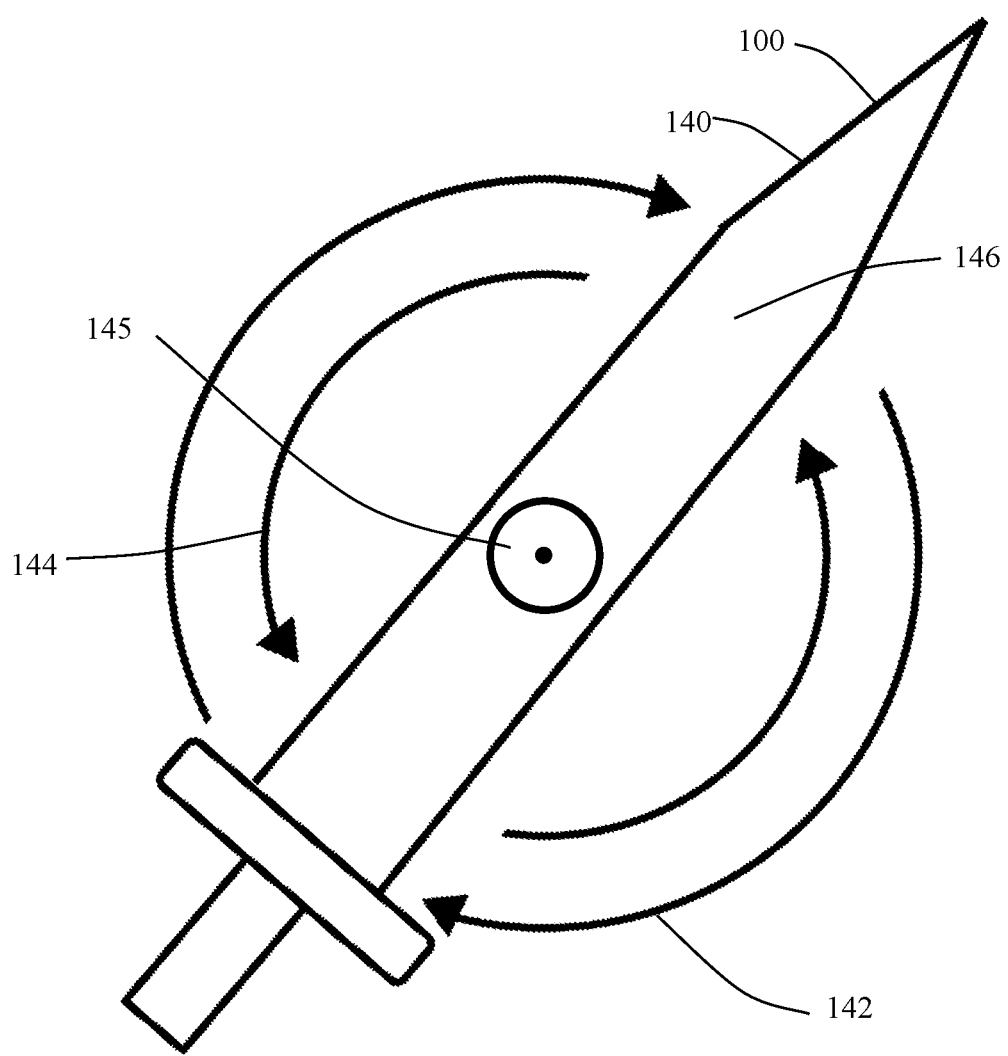
FIG. 5 is a view of a most preferred embodiment of a reticle of the present invention.
Figure 6:
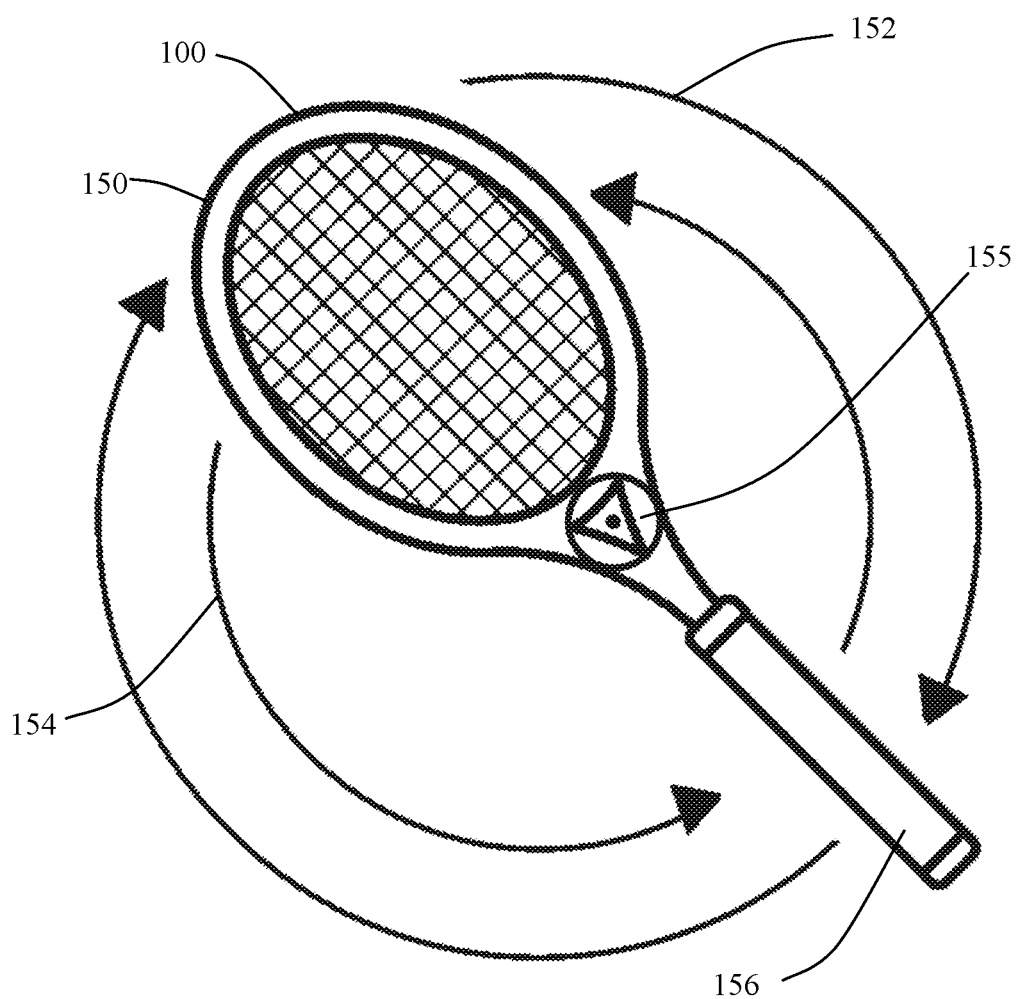
FIG. 6 is a view of another preferred embodiment of a reticle of the present invention.
Figure 7:
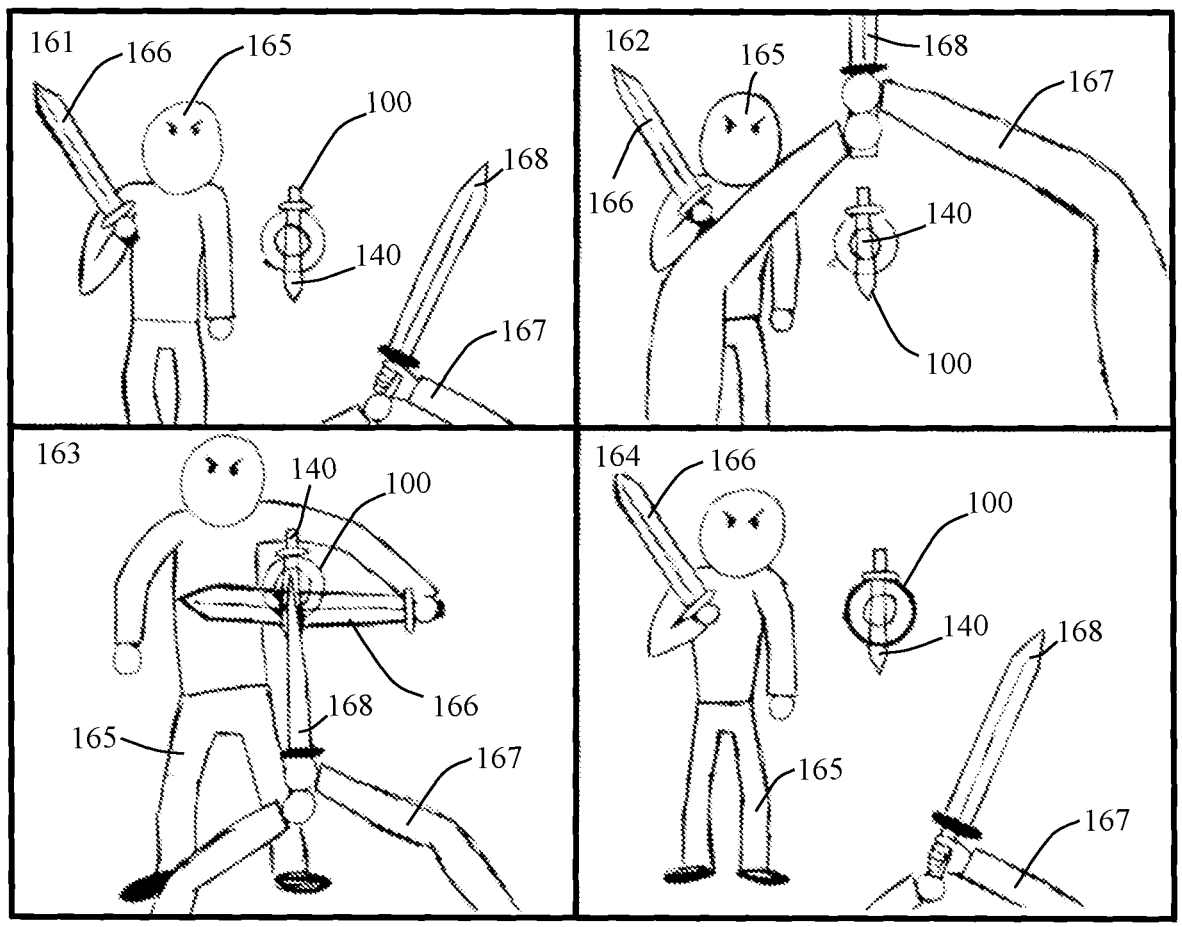
FIG. 7 is a diagram illustrating first person video game combat using the present invention.
Figure 8:
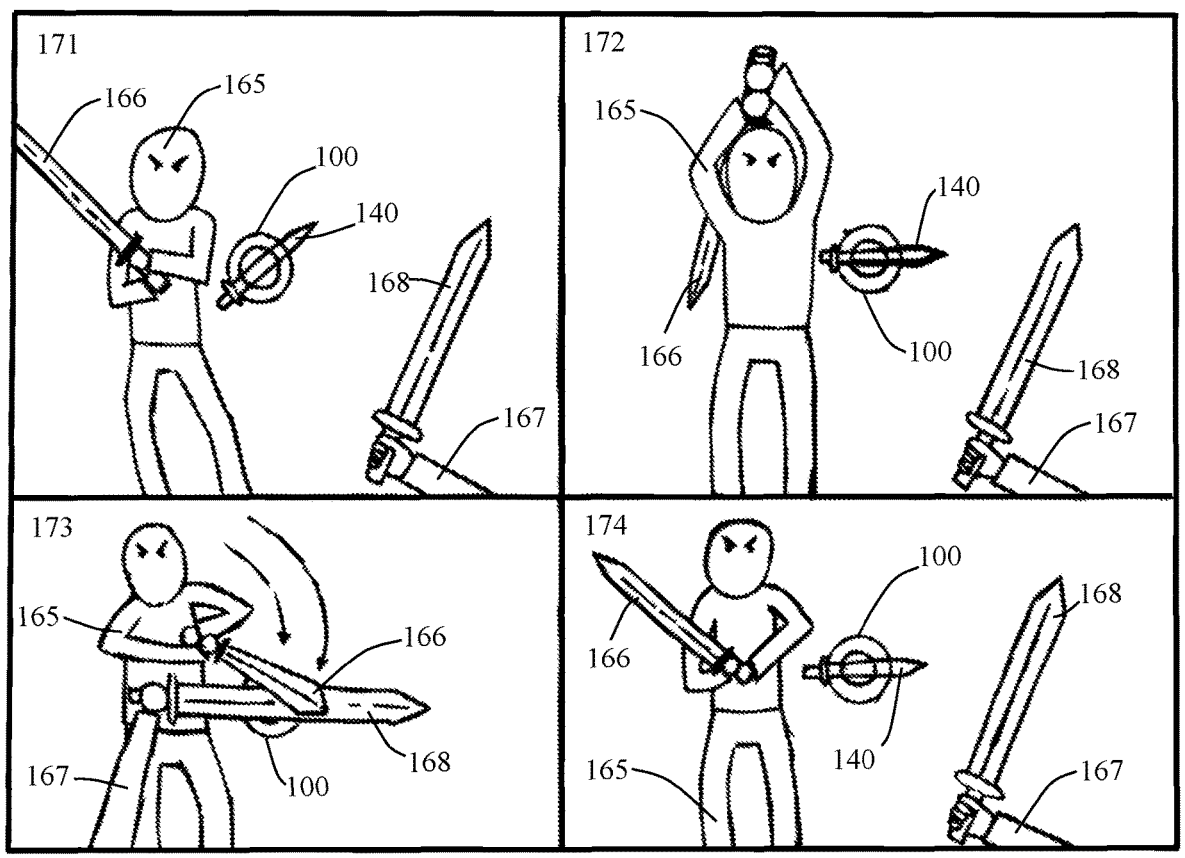
FIG. 8 is another diagram illustrating first person video game combat using the present invention.
Figure 9:
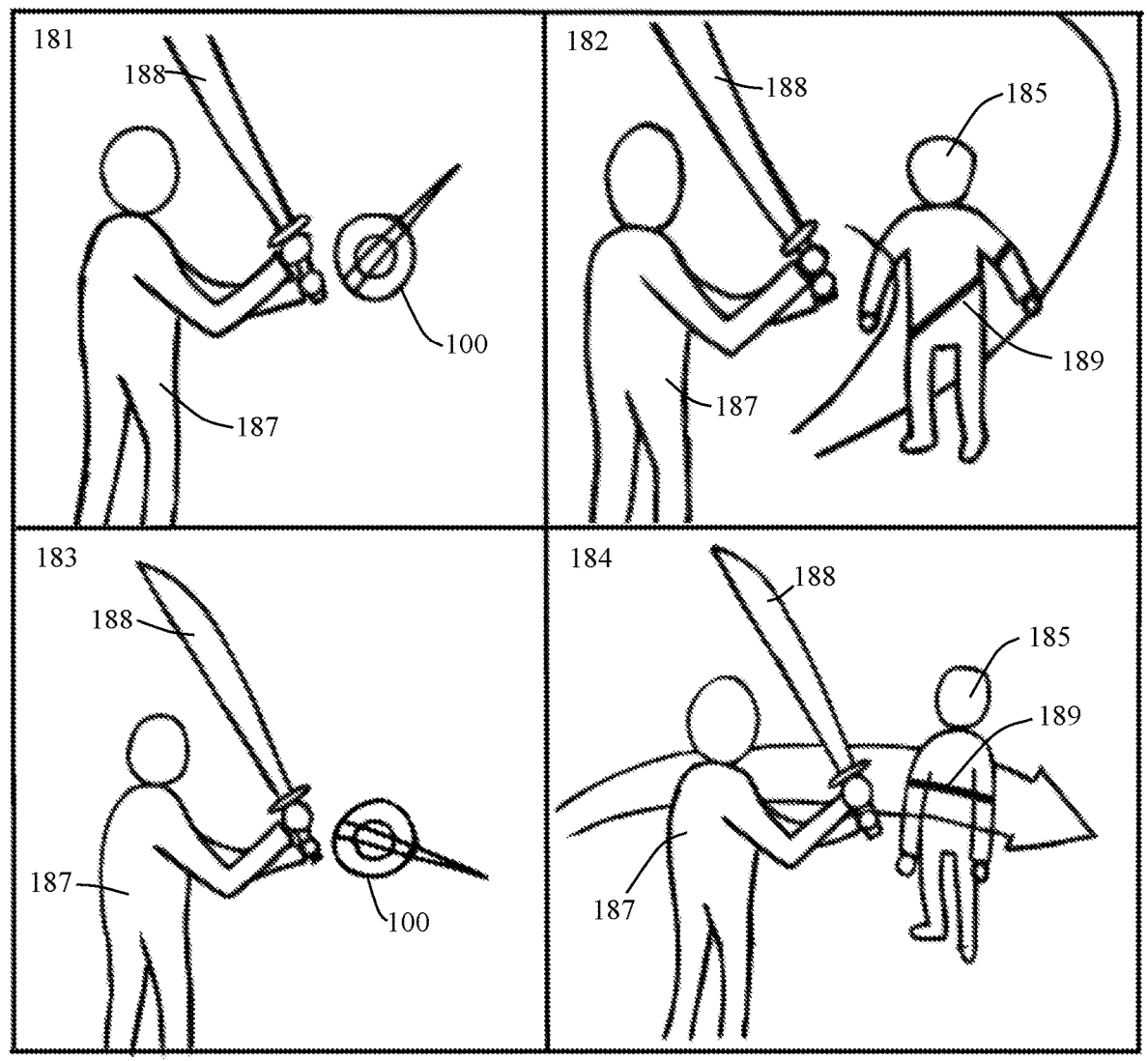
FIG. 9 is a diagram illustrating third person video combat using the present invention.
Figure 10:
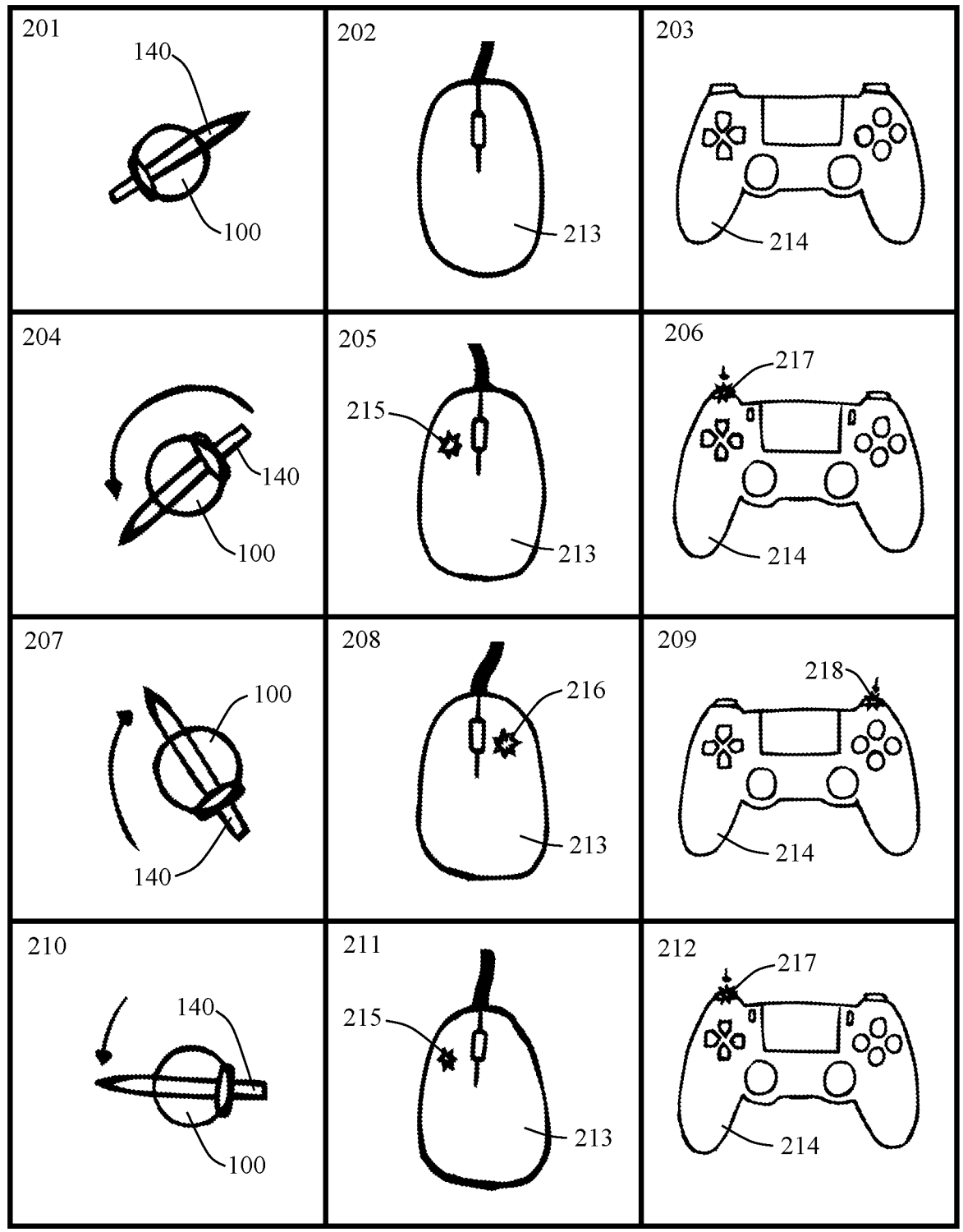
FIG. 10 is a diagram, which describes the motion of a reticle of FIG. 5 in response to entered commands.
Figure 11:
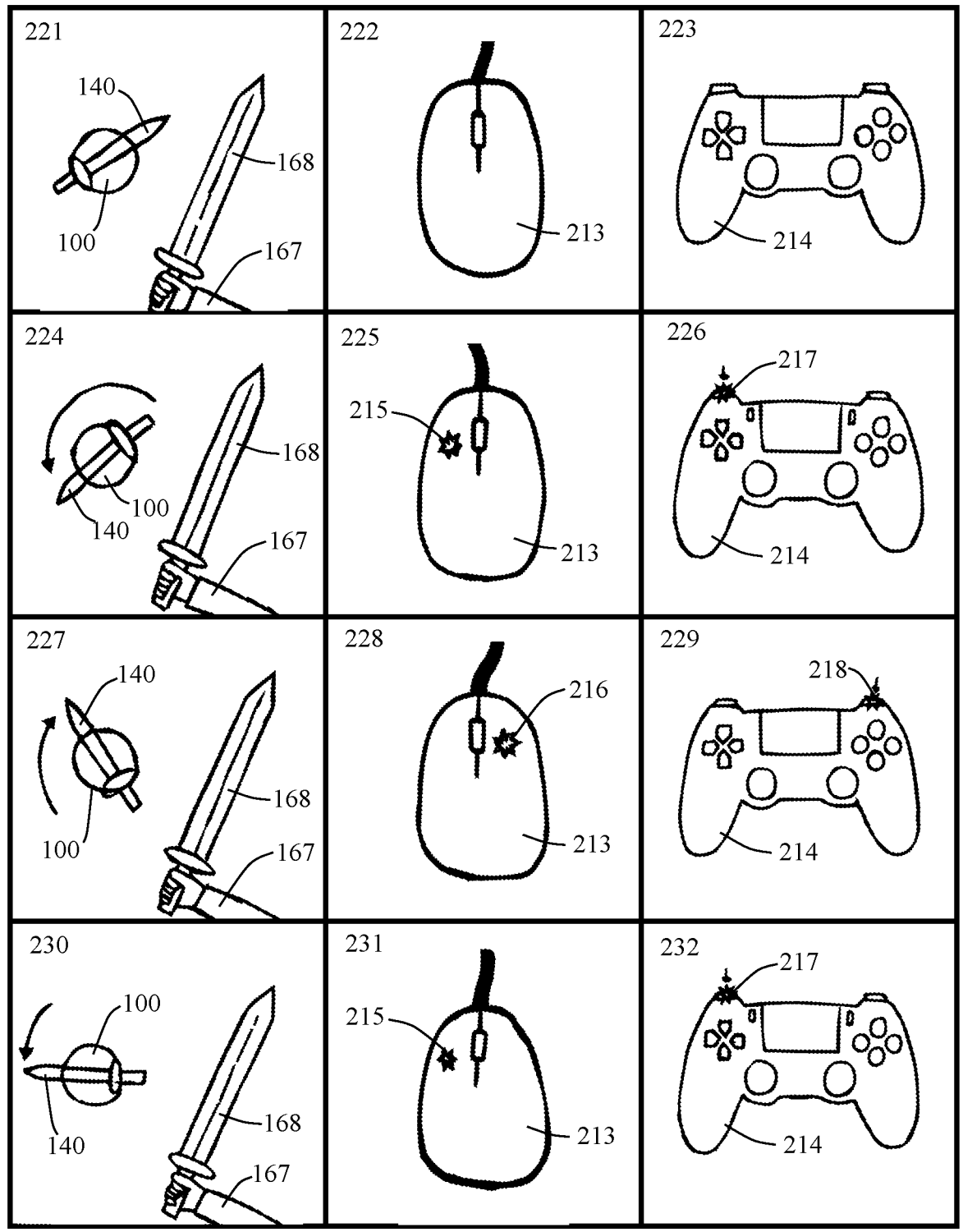
FIG. 11 is another diagram, which describes the motion of a reticle of FIG. 5 in response to entered commands.
Figure 12:
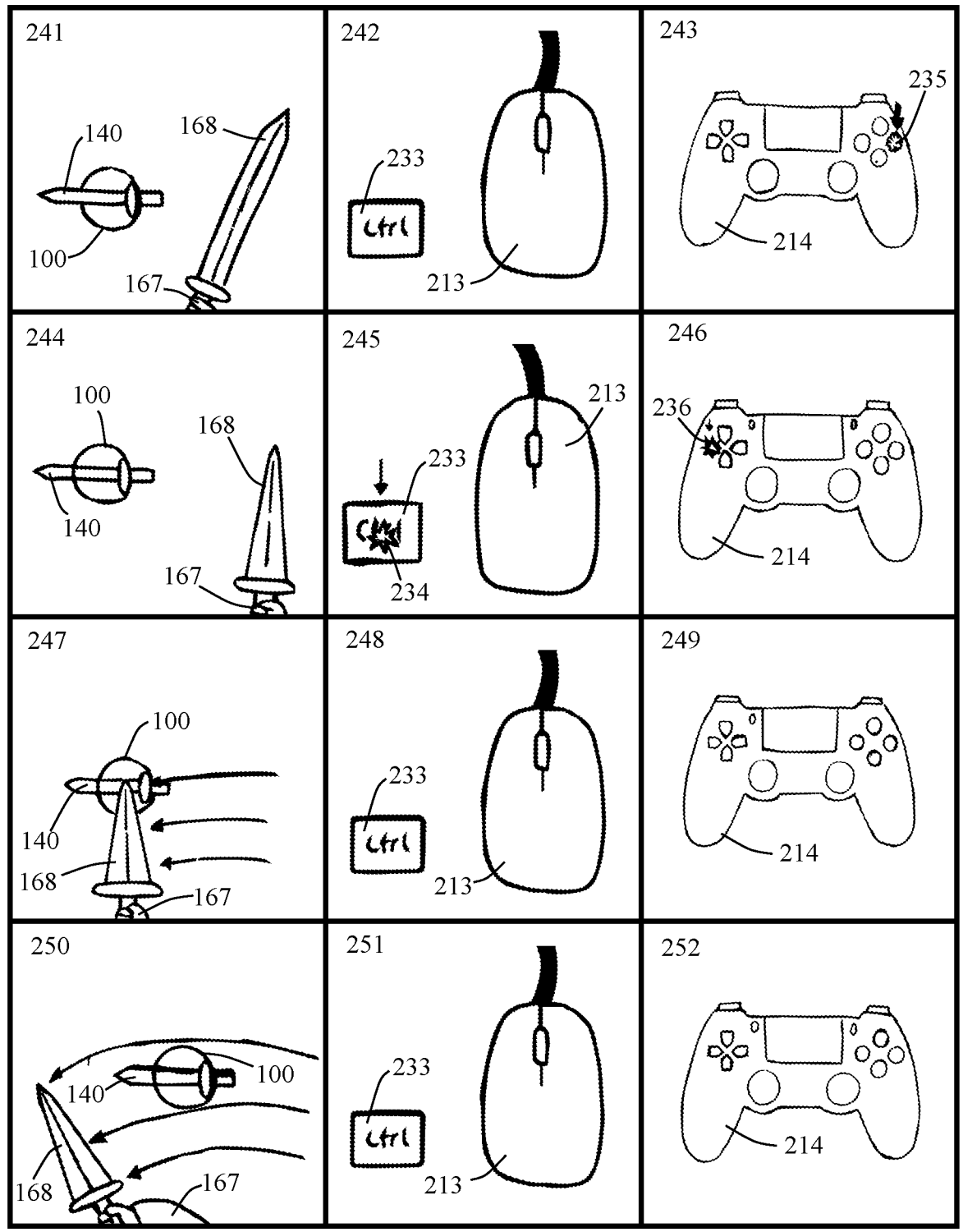
FIG. 12 is another diagram, which describes the motion of a reticle of FIG. 5 in response to entered commands.
Figure 13:
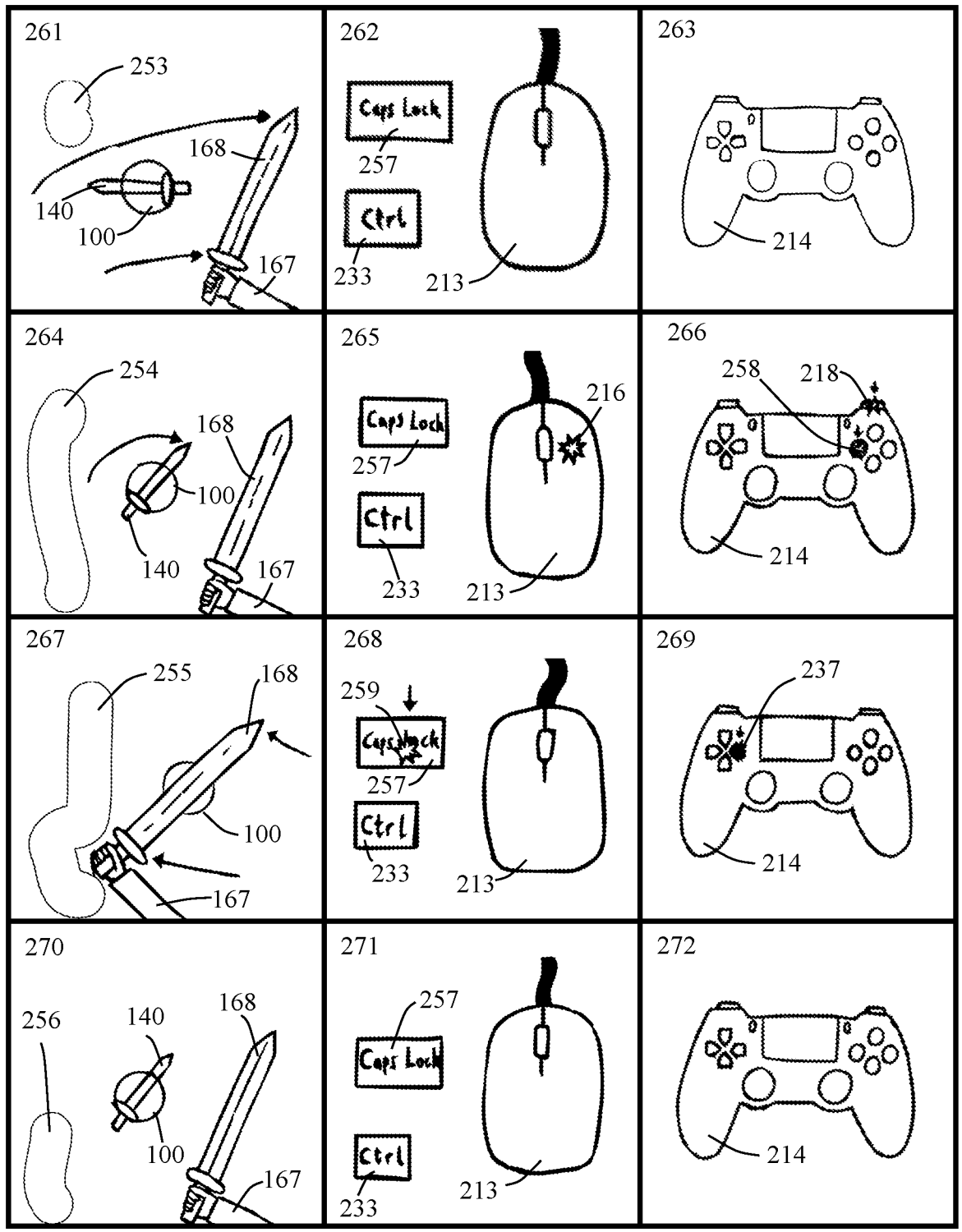
FIG. 13 is another diagram, which describes the motion of a reticle of FIG. 5 in response to entered commands.
Figure 14:
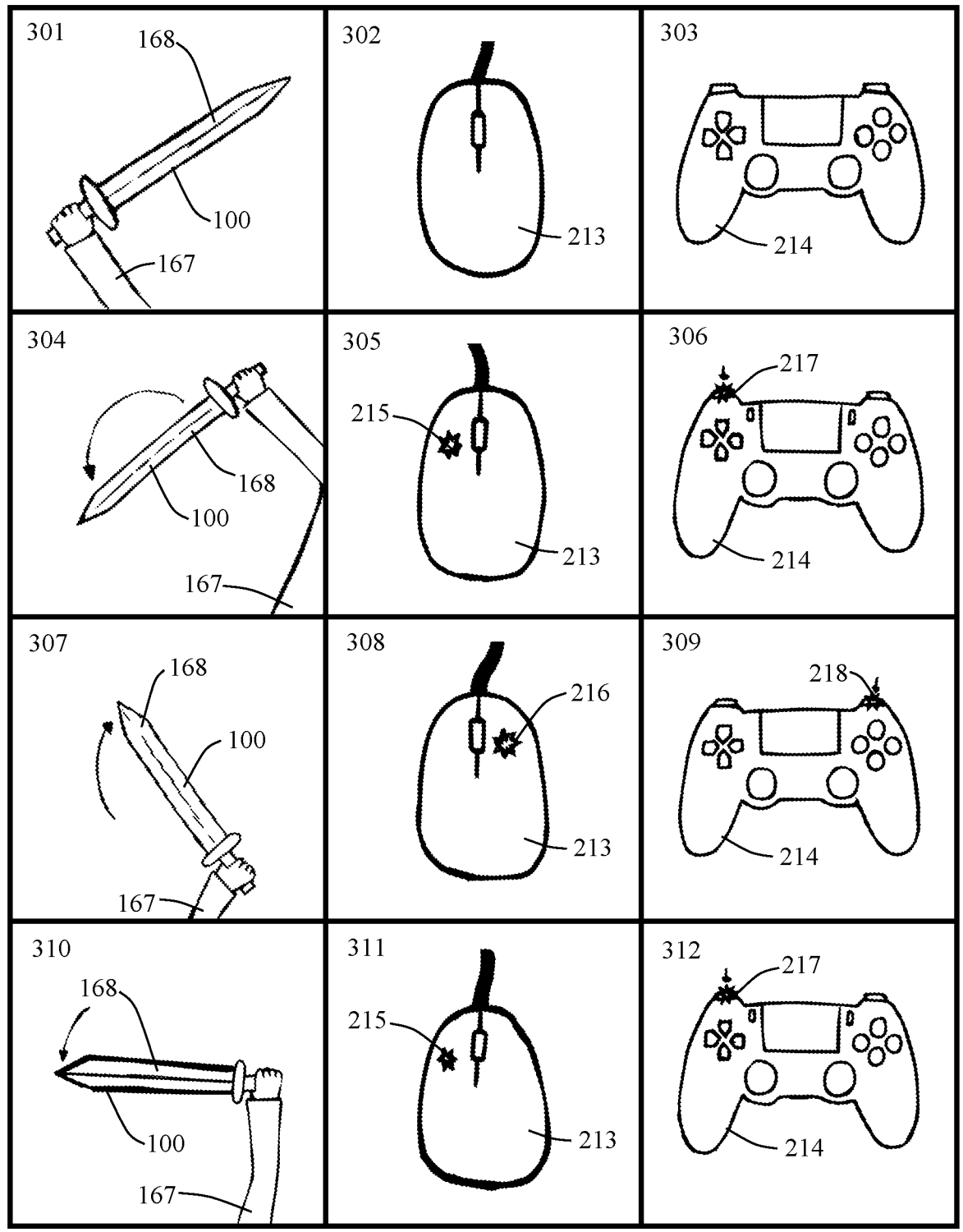
FIG. 14 is a diagram, which describes the motion of a reticle of another preferred embodiment of the present invention in response to entered commands.
Figure 15:
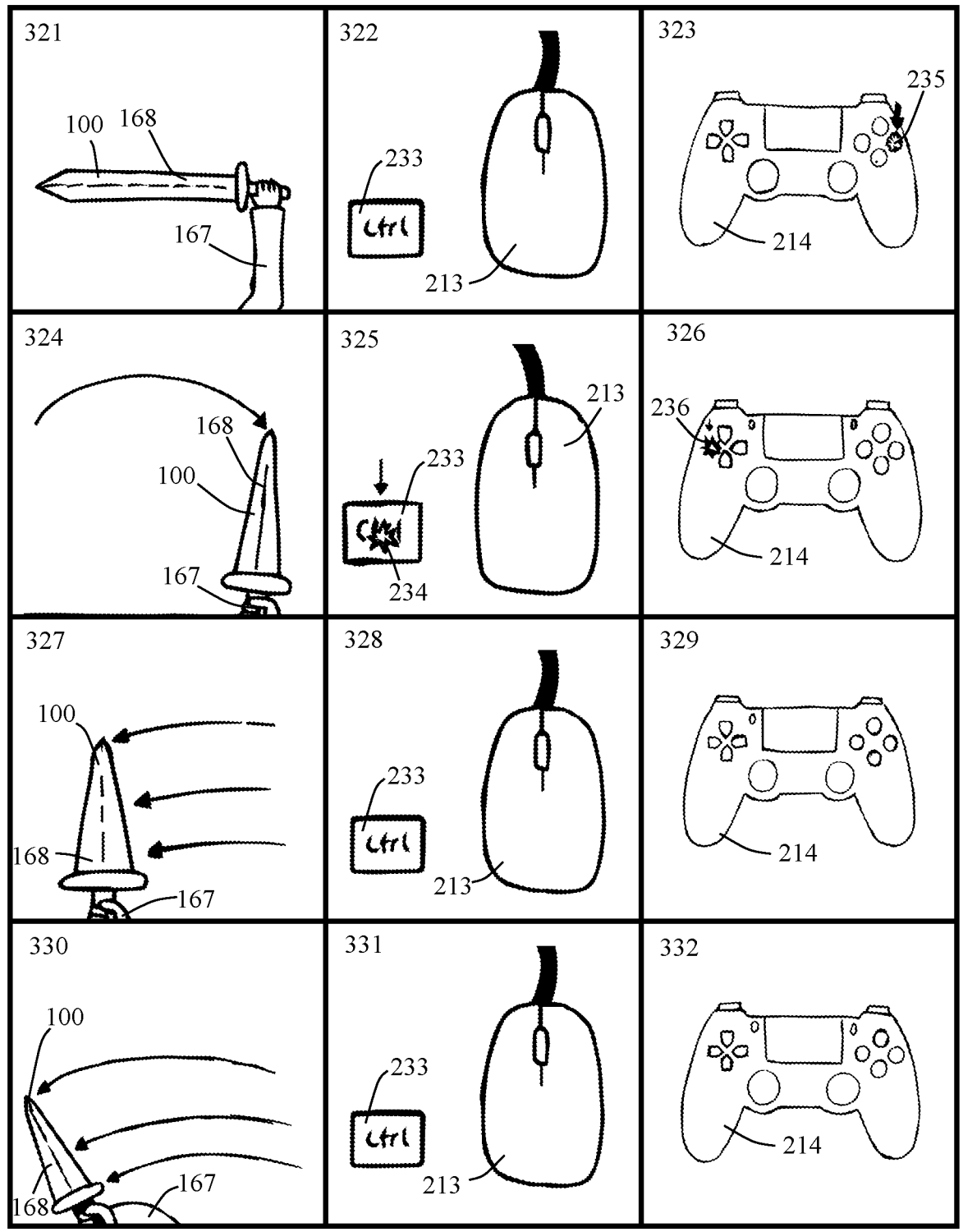
FIG. 15 is another diagram, which describes the motion of a reticle of FIG. 14 in response to entered commands.
Figure 16:
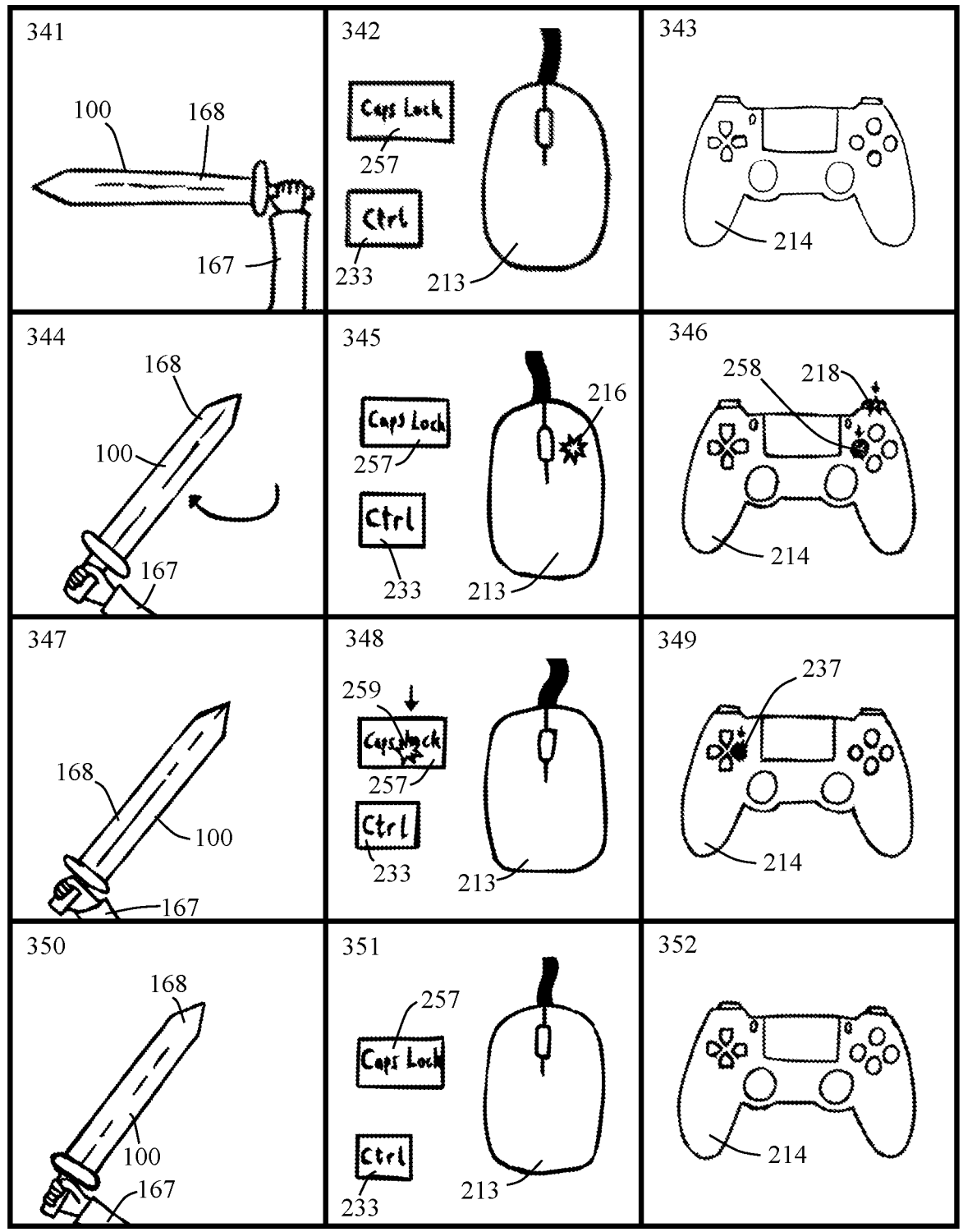
FIG. 16 is another diagram, which describes the motion of a reticle of FIG. 14 in response to entered commands.
Figure 17:
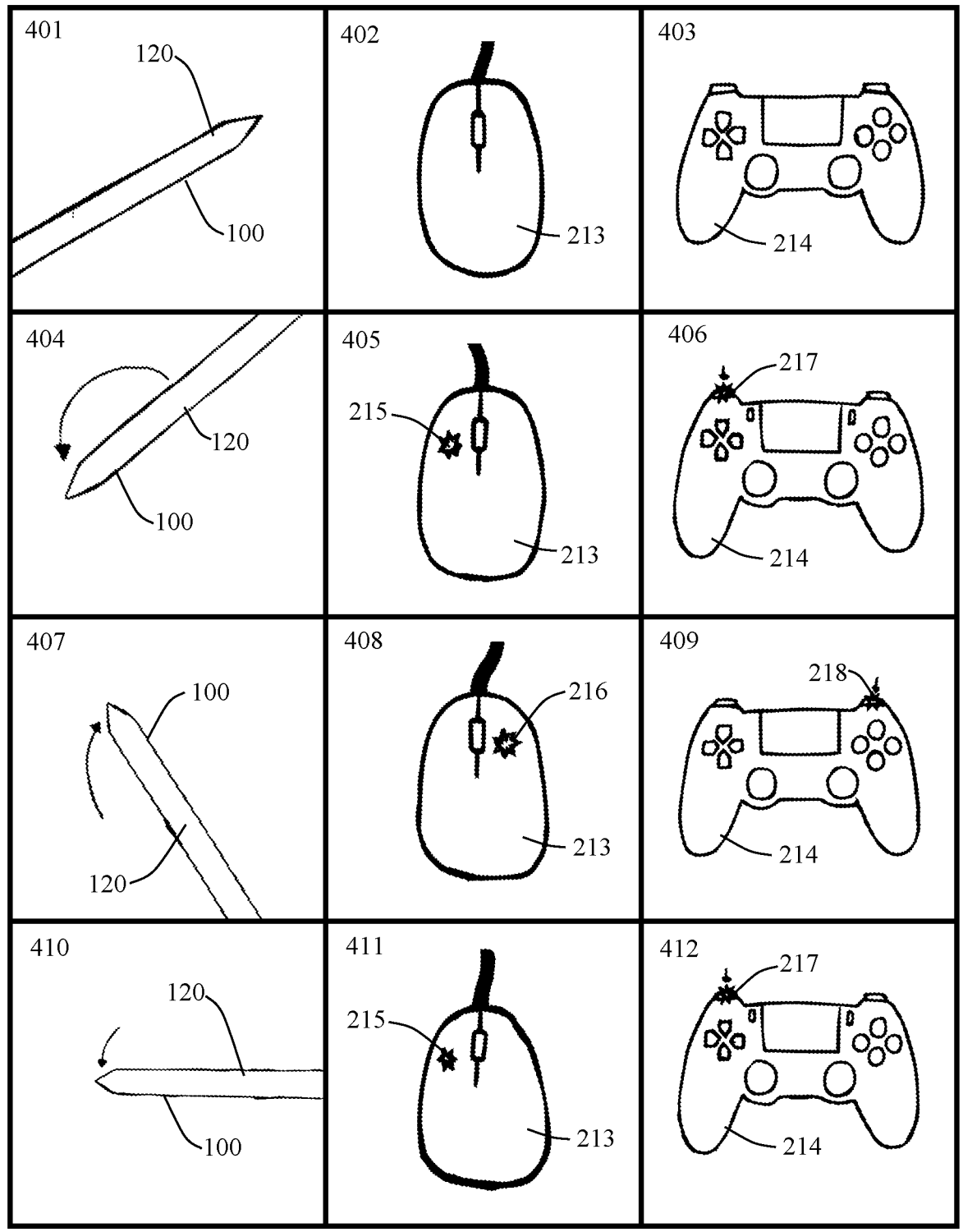
FIG. 17 is a diagram, which describes the motion of a reticle of FIG. 2 in response to entered commands.
Figure 18:
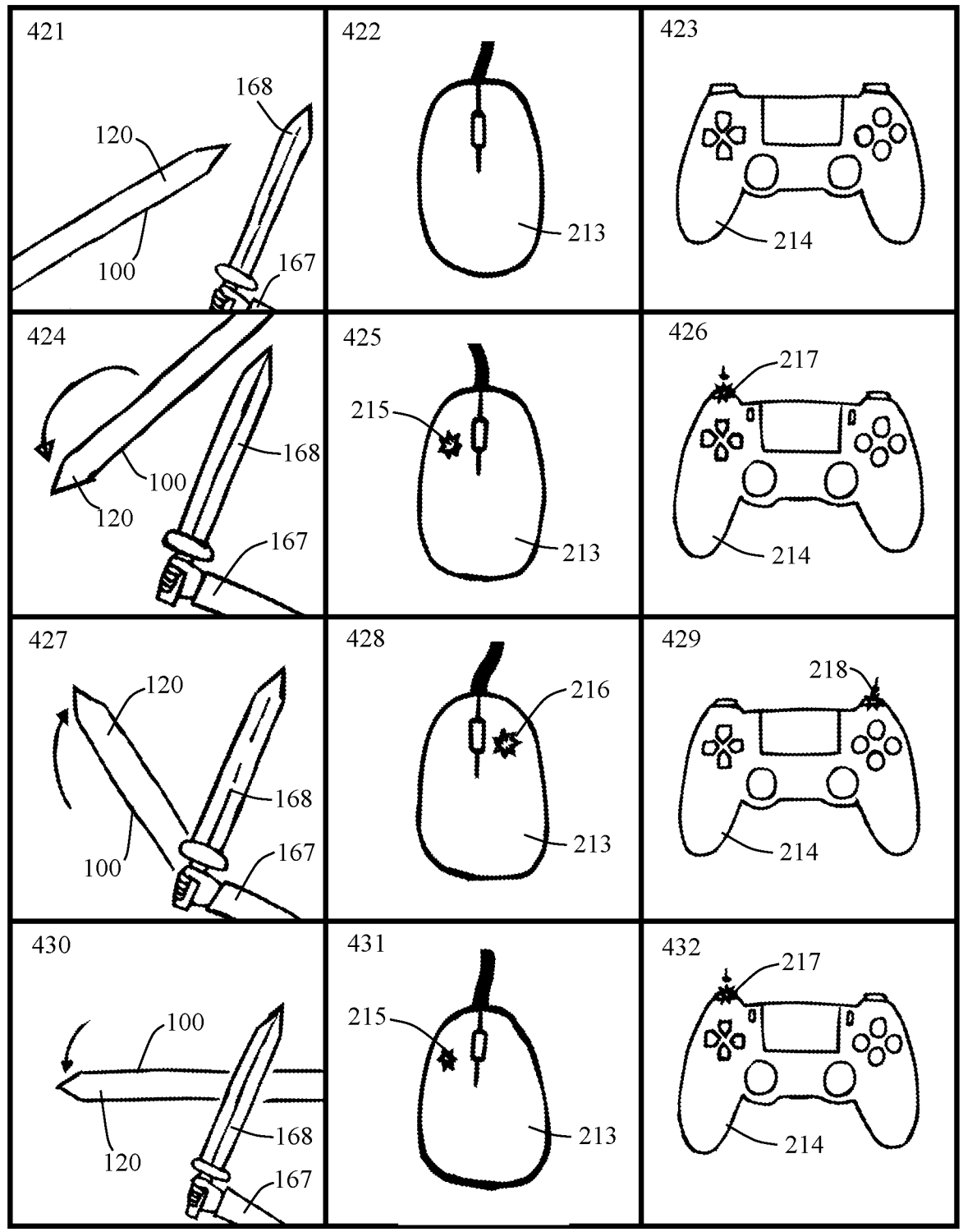
FIG. 18 is another diagram, which describes the motion of a reticle of FIG. 2 in response to entered commands.
Figure 19:
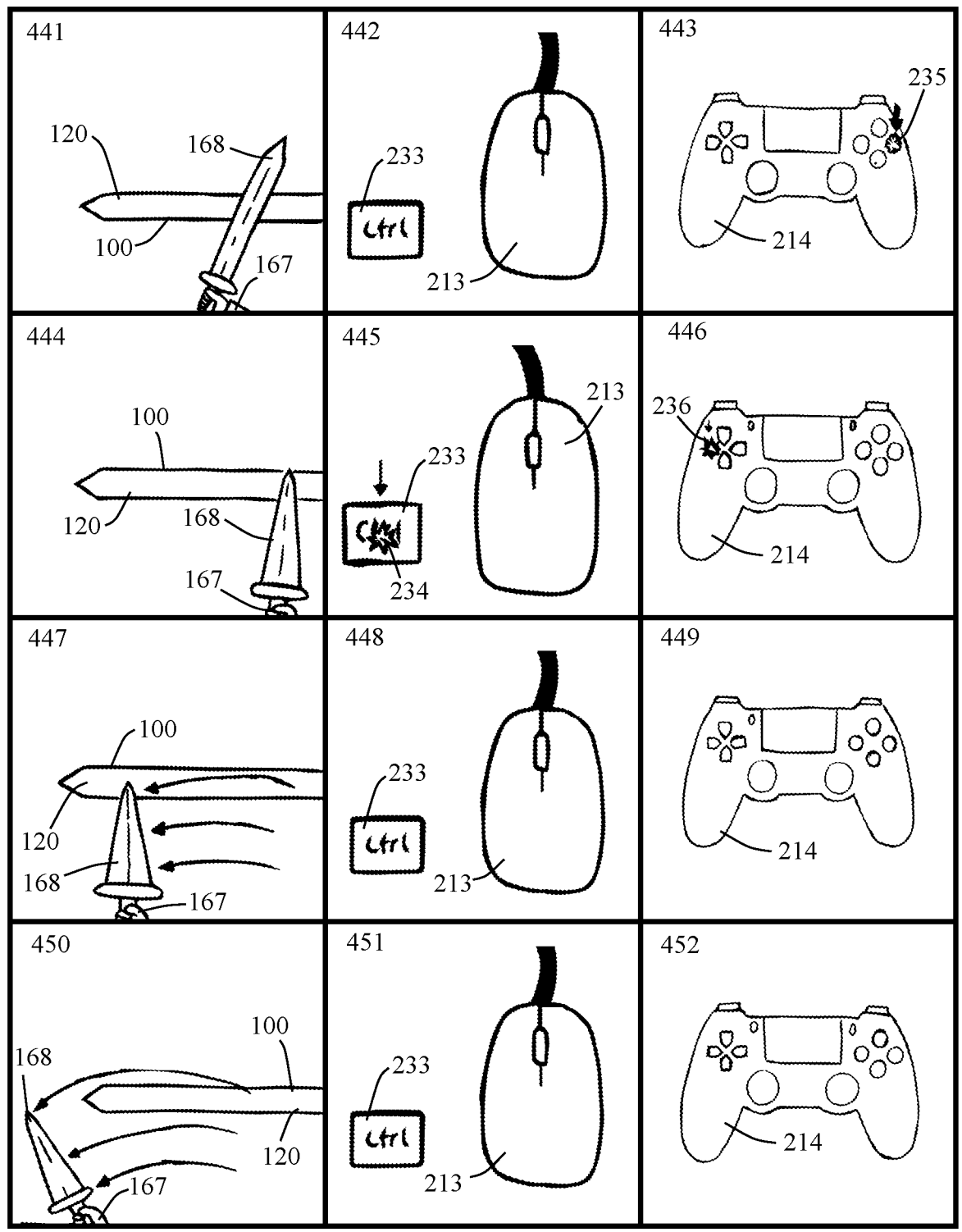
FIG. 19 is another diagram, which describes the motion of a reticle of FIG. 2 in response to entered commands.
Figure 20:
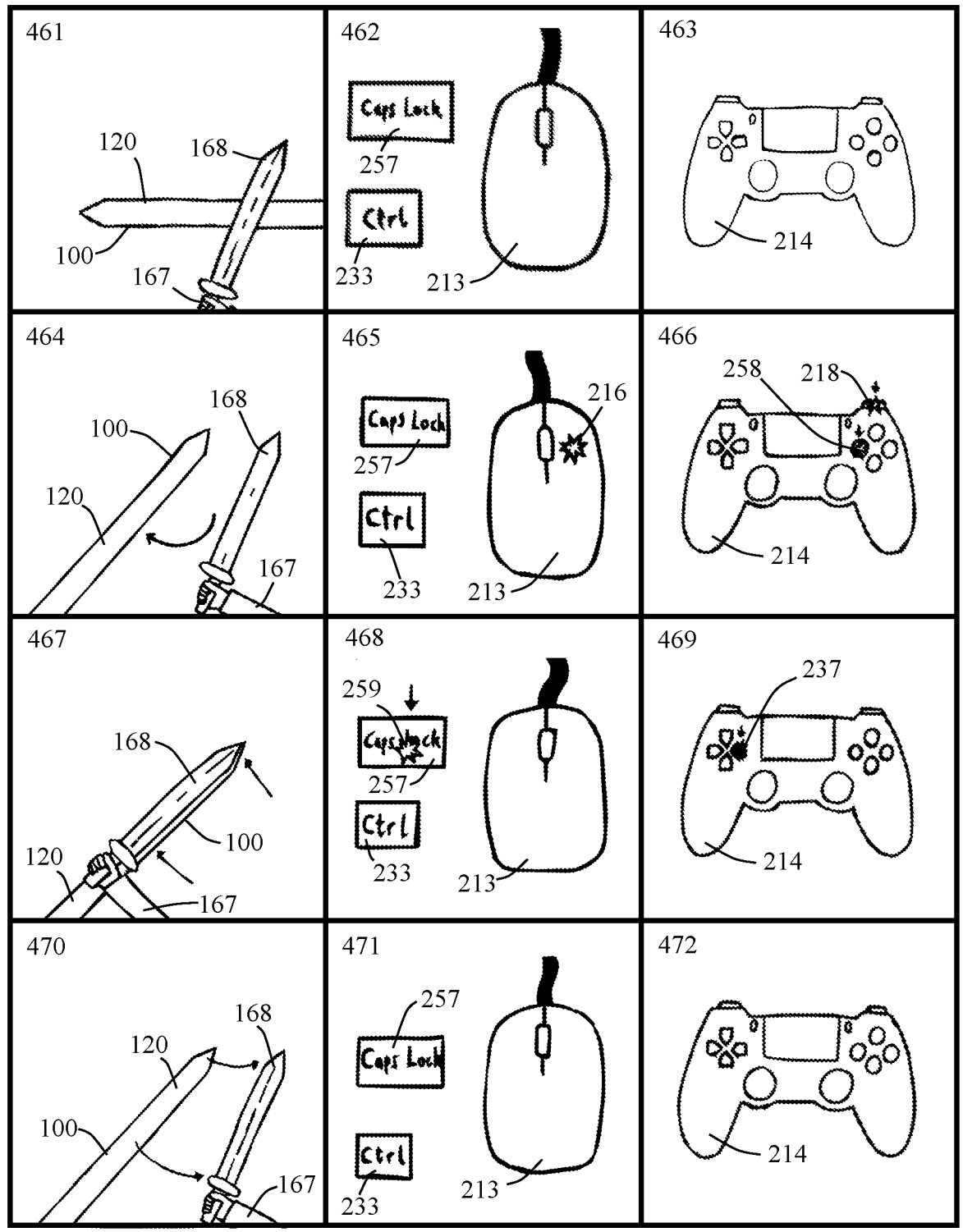
FIG. 20 is another diagram, which describes the motion of a reticle of FIG. 2 in response to entered commands.
Figure 21:
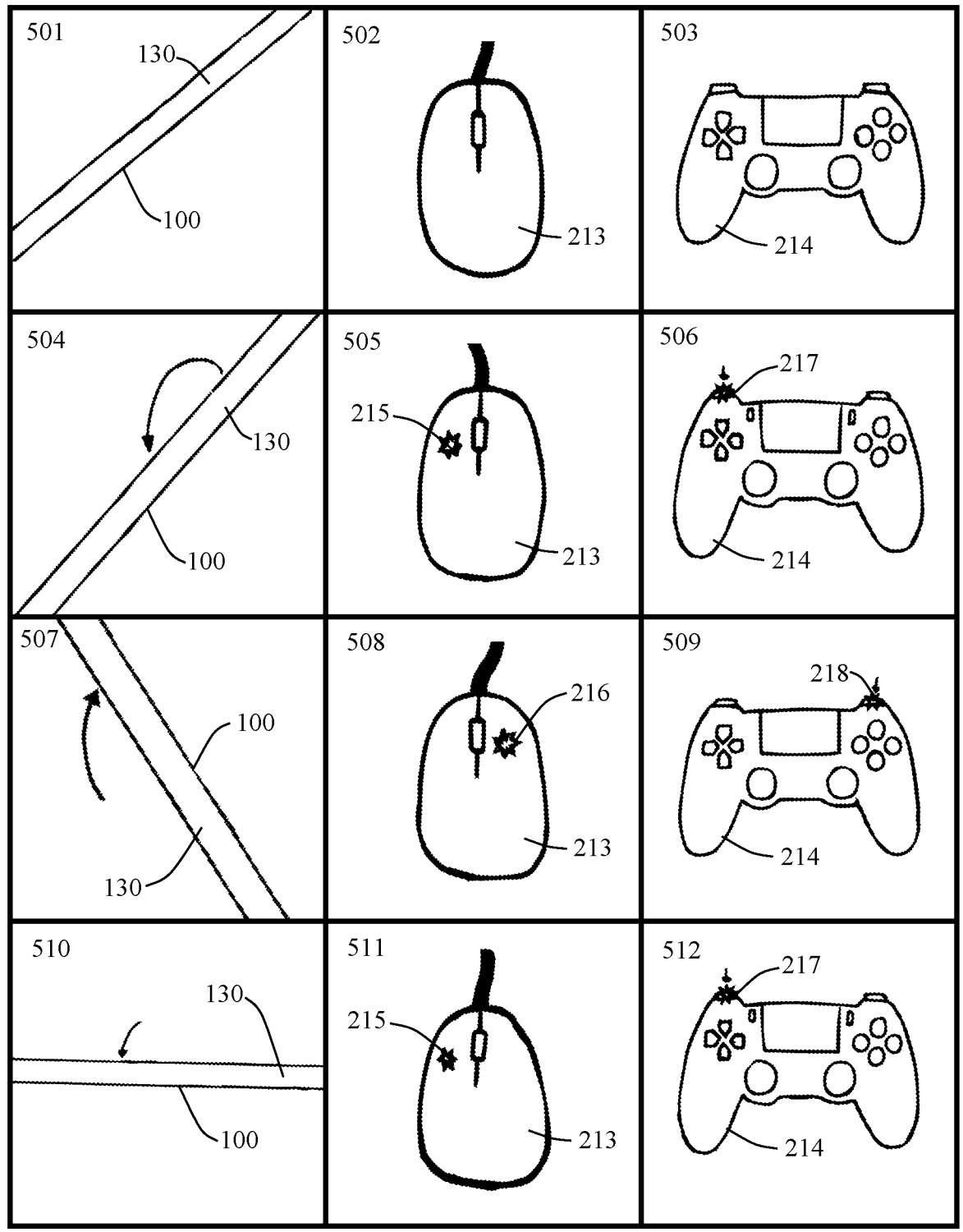
FIG. 21 is a diagram, which describes the motion of a reticle of FIG. 3 in response to entered commands.
Figure 22:
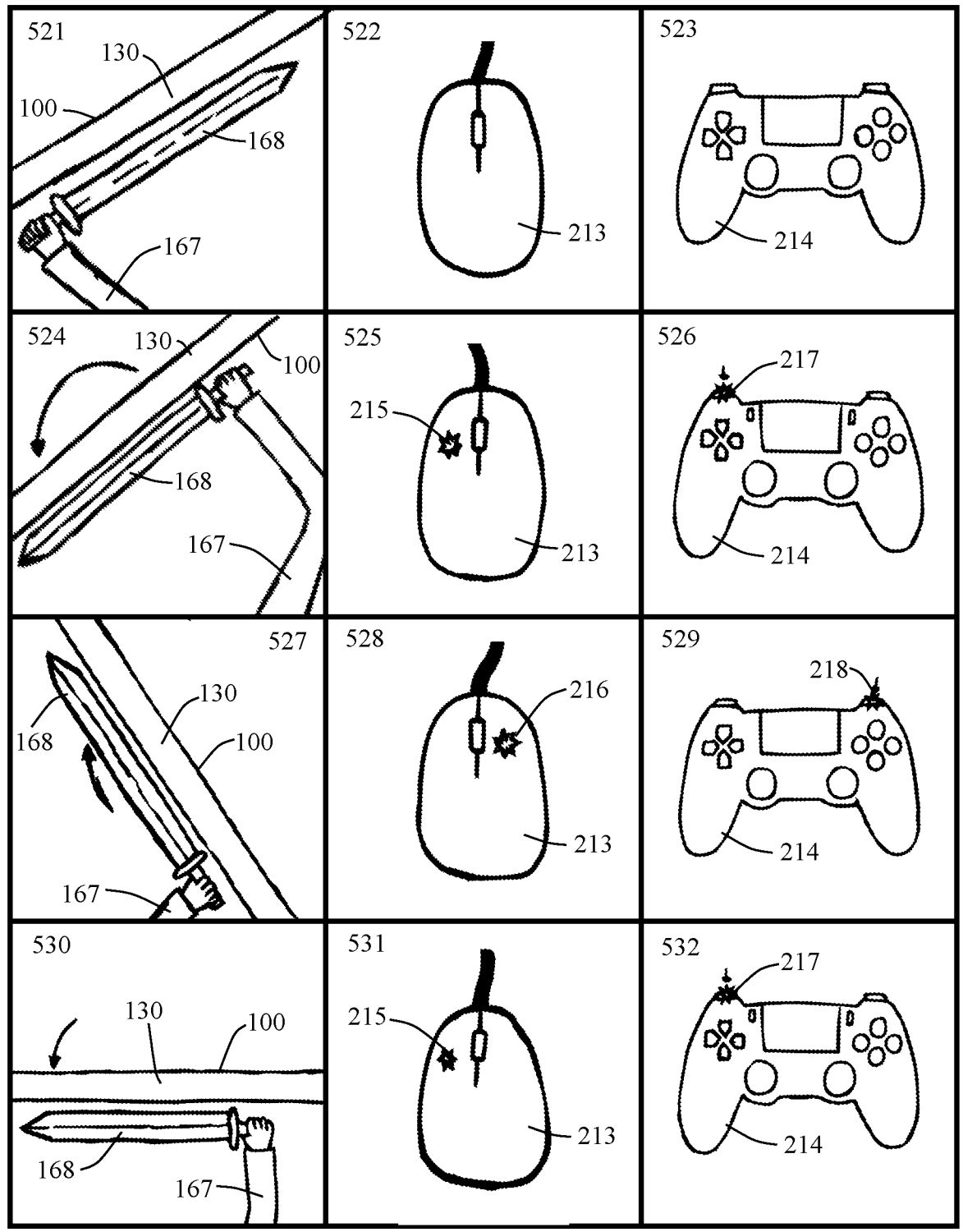
FIG. 22 is another diagram, which describes the motion of a reticle of FIG. 3 in response to entered commands.
Figure 23:
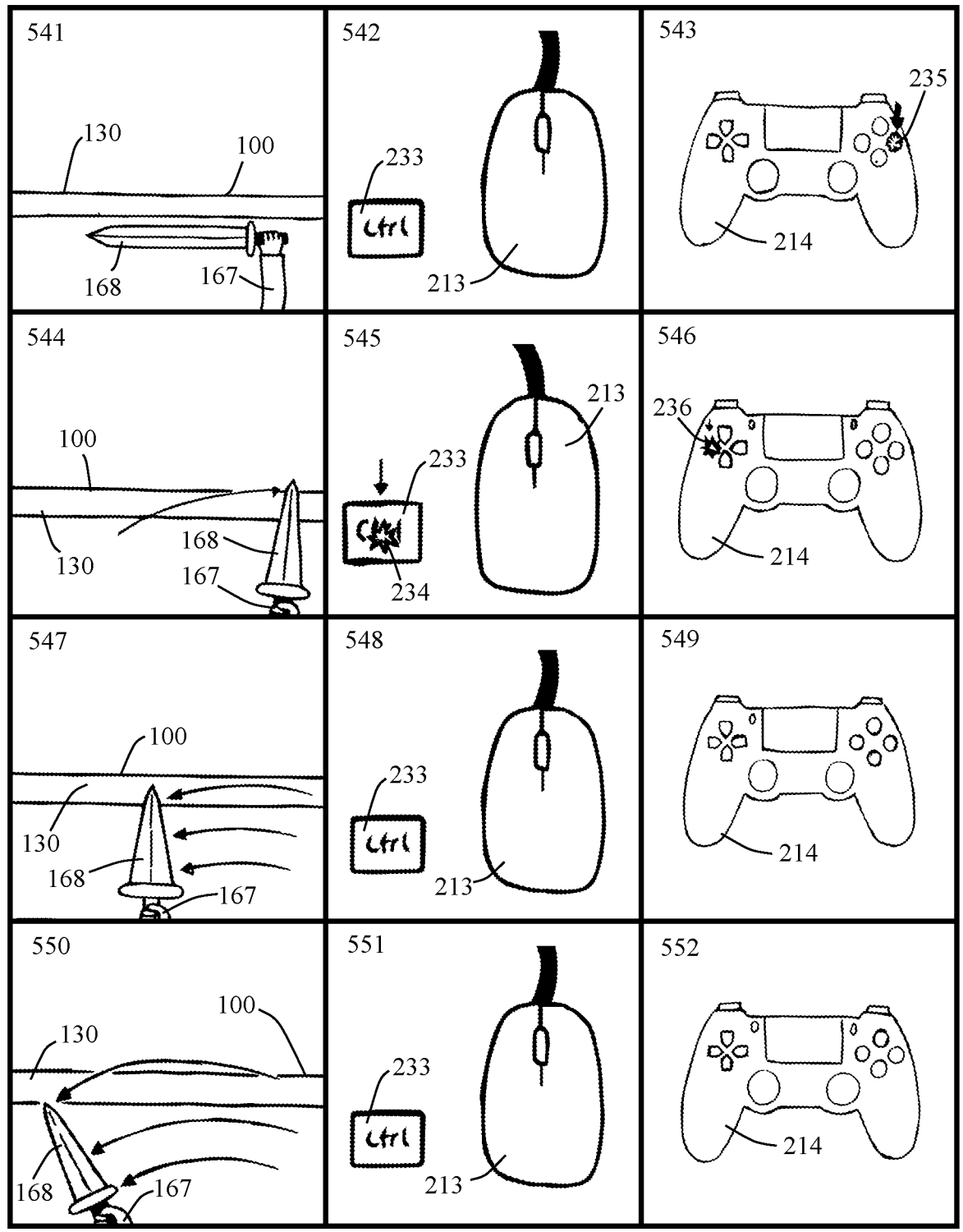
FIG. 23 is another diagram, which describes the motion of a reticle of FIG. 3 in response to entered commands.
Figure 24:
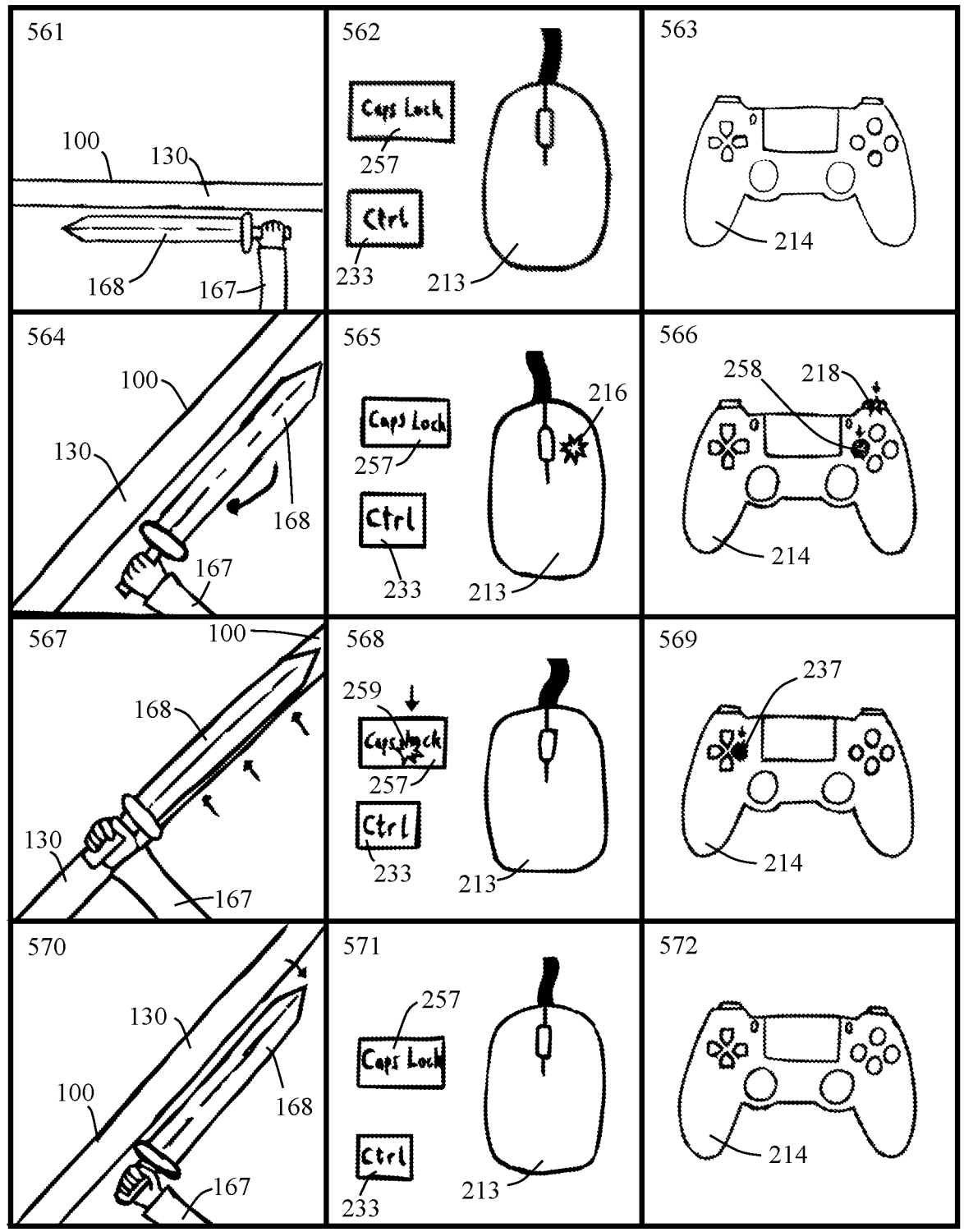
FIG. 24 is another diagram, which describes the motion of a reticle of FIG. 3 in response to entered commands.
Figure 25:
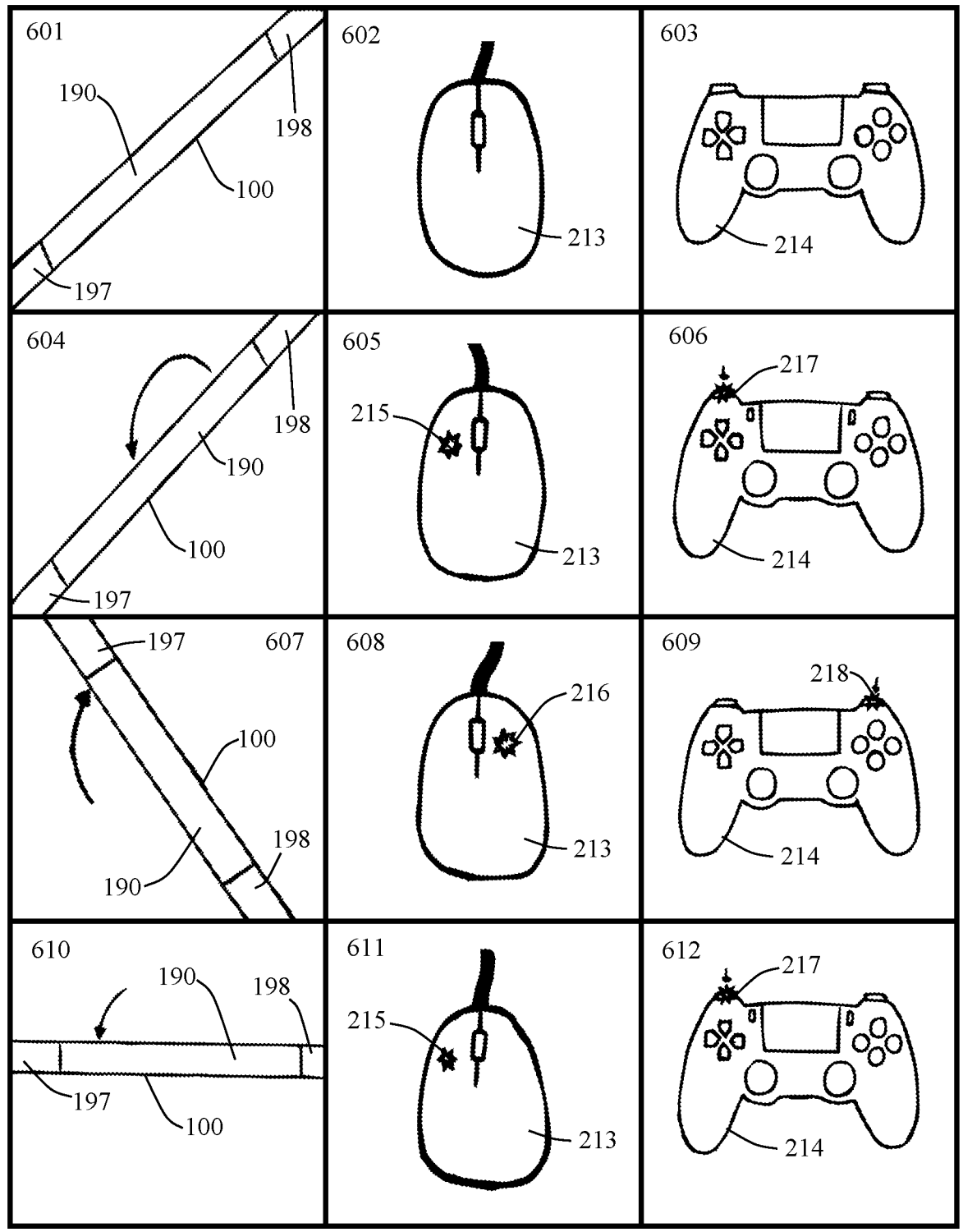
FIG. 25 is a diagram, which describes the motion of a reticle of FIG. 4 in response to entered commands.
Figure 26:
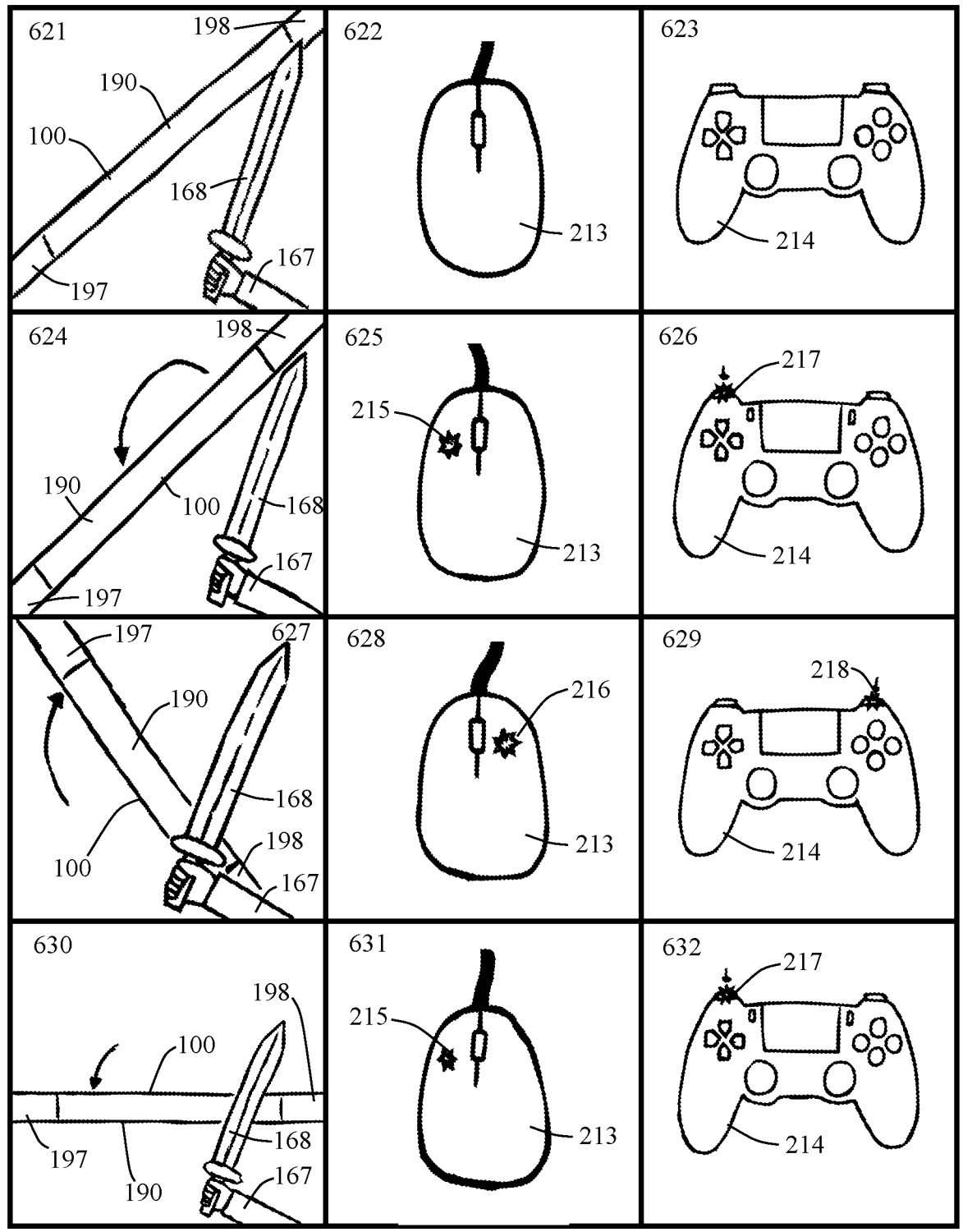
FIG. 26 is another diagram, which describes the motion of a reticle of FIG. 4 in response to entered commands.
Figure 27:
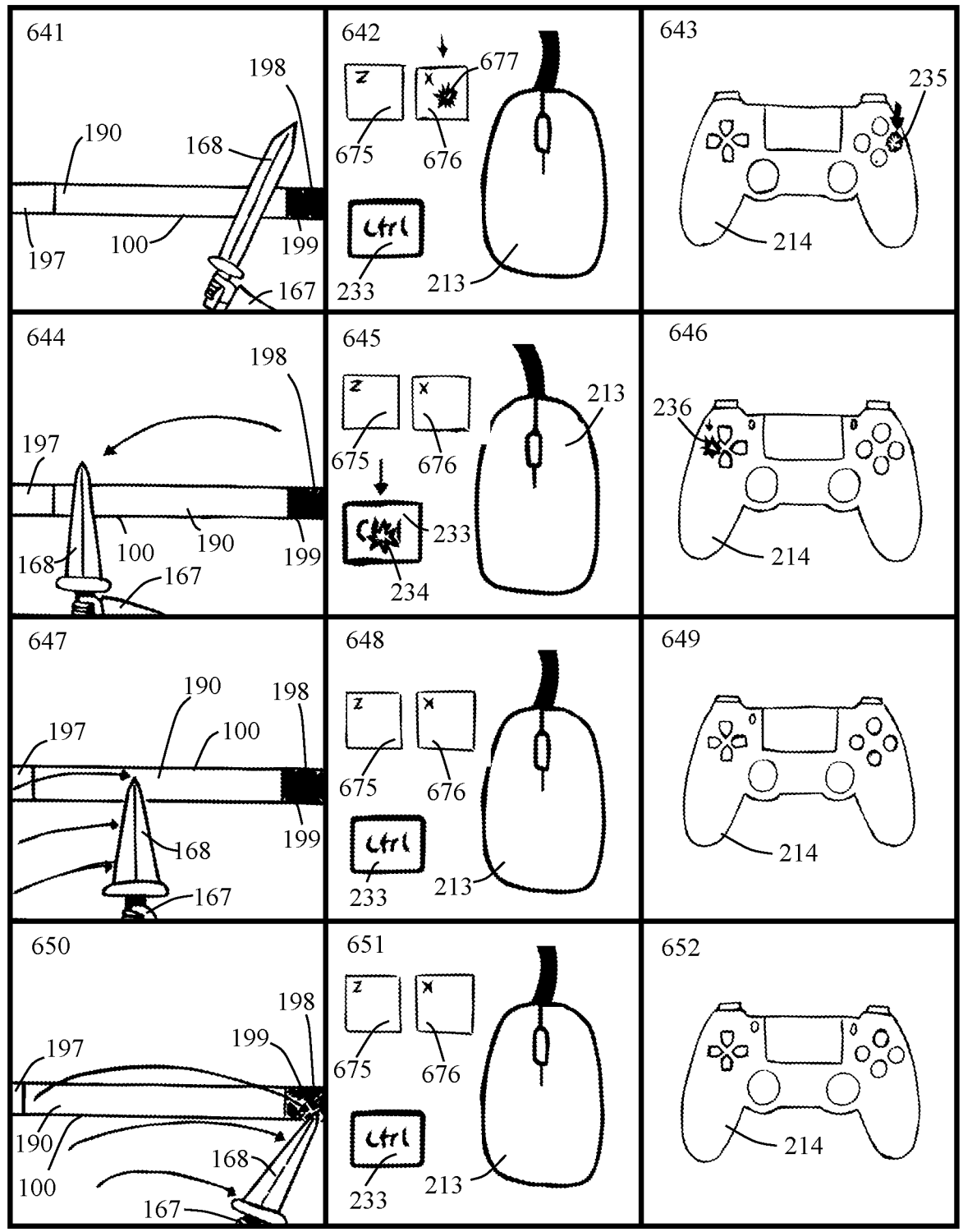
FIG. 27 is another diagram, which describes the motion of a reticle of FIG. 4 in response to entered commands.
Figure 28:
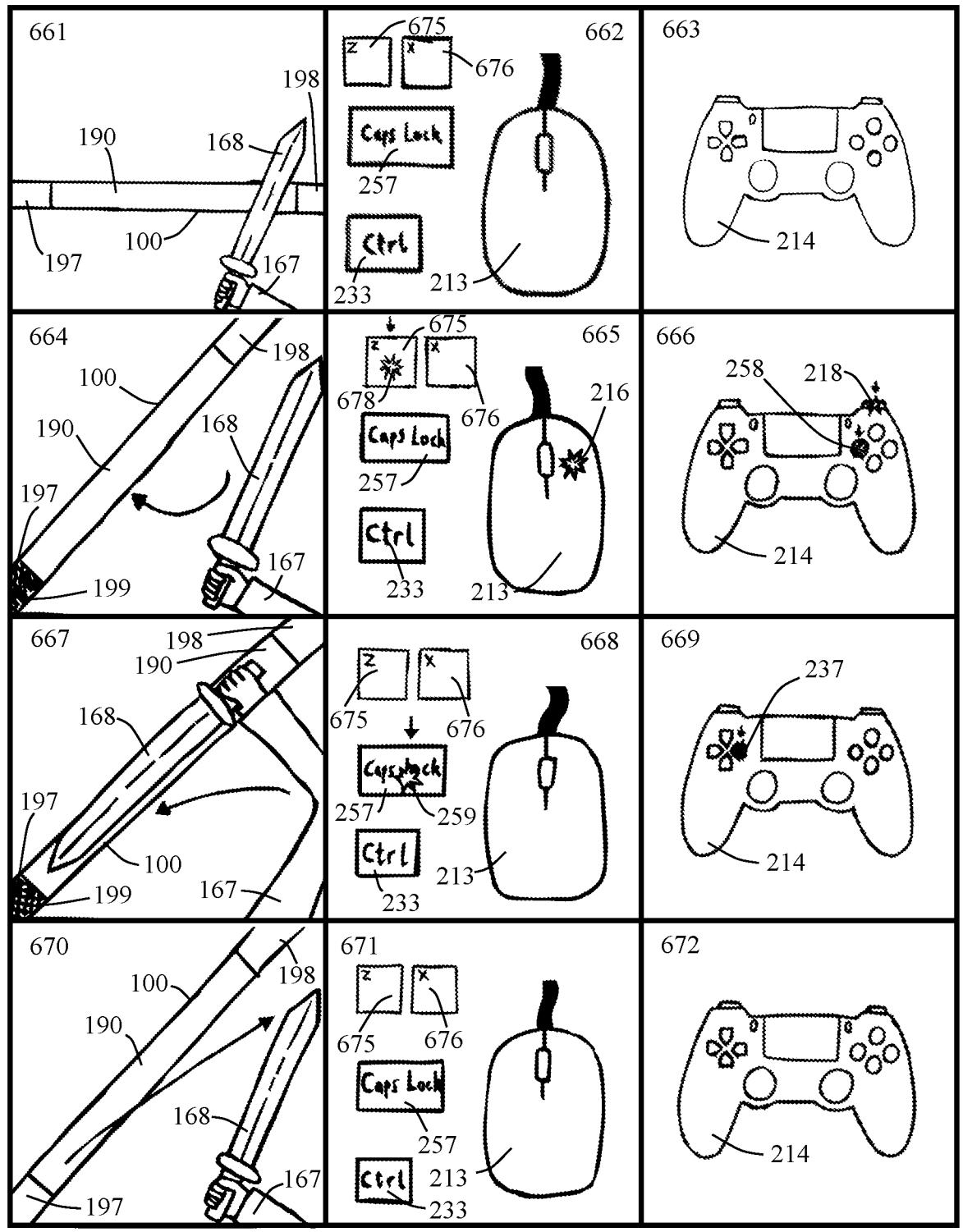
FIG. 28 is another diagram, which describes the motion of a reticle of FIG. 4 in response to entered commands.
Figure 29:
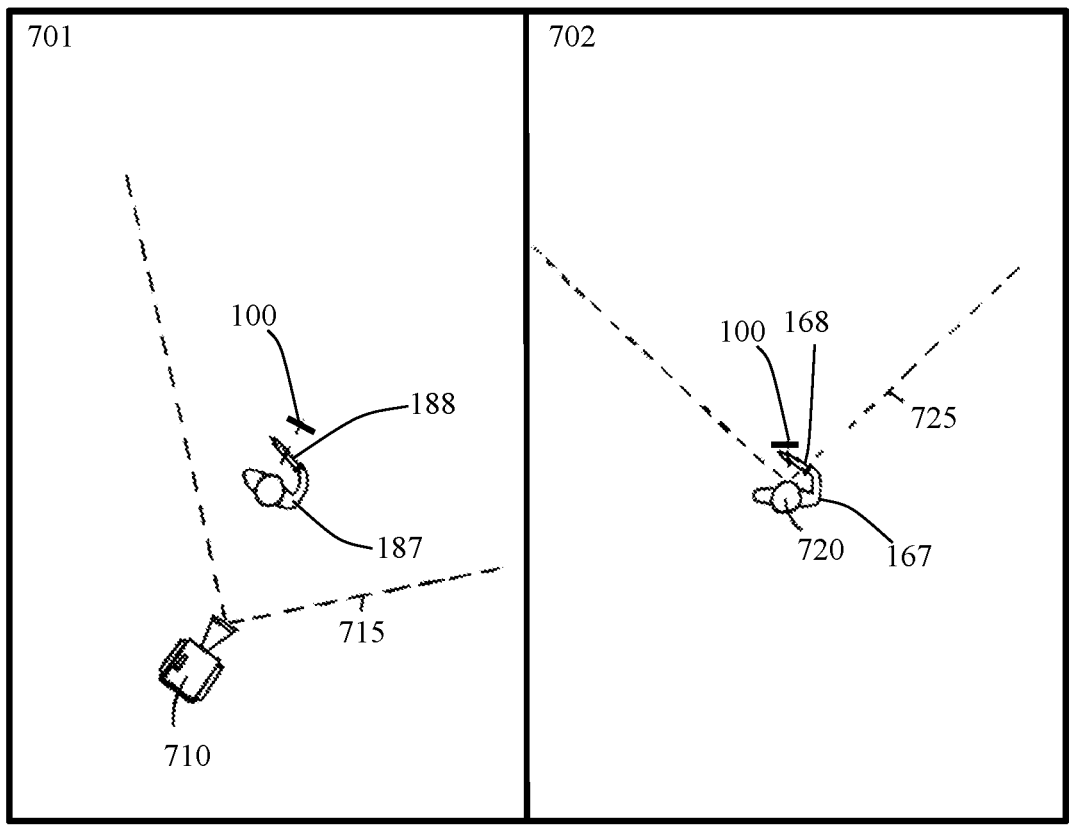
FIG. 29 is a diagram comparing a first person video game player experience to a third person video game player experience.
Figure 30:
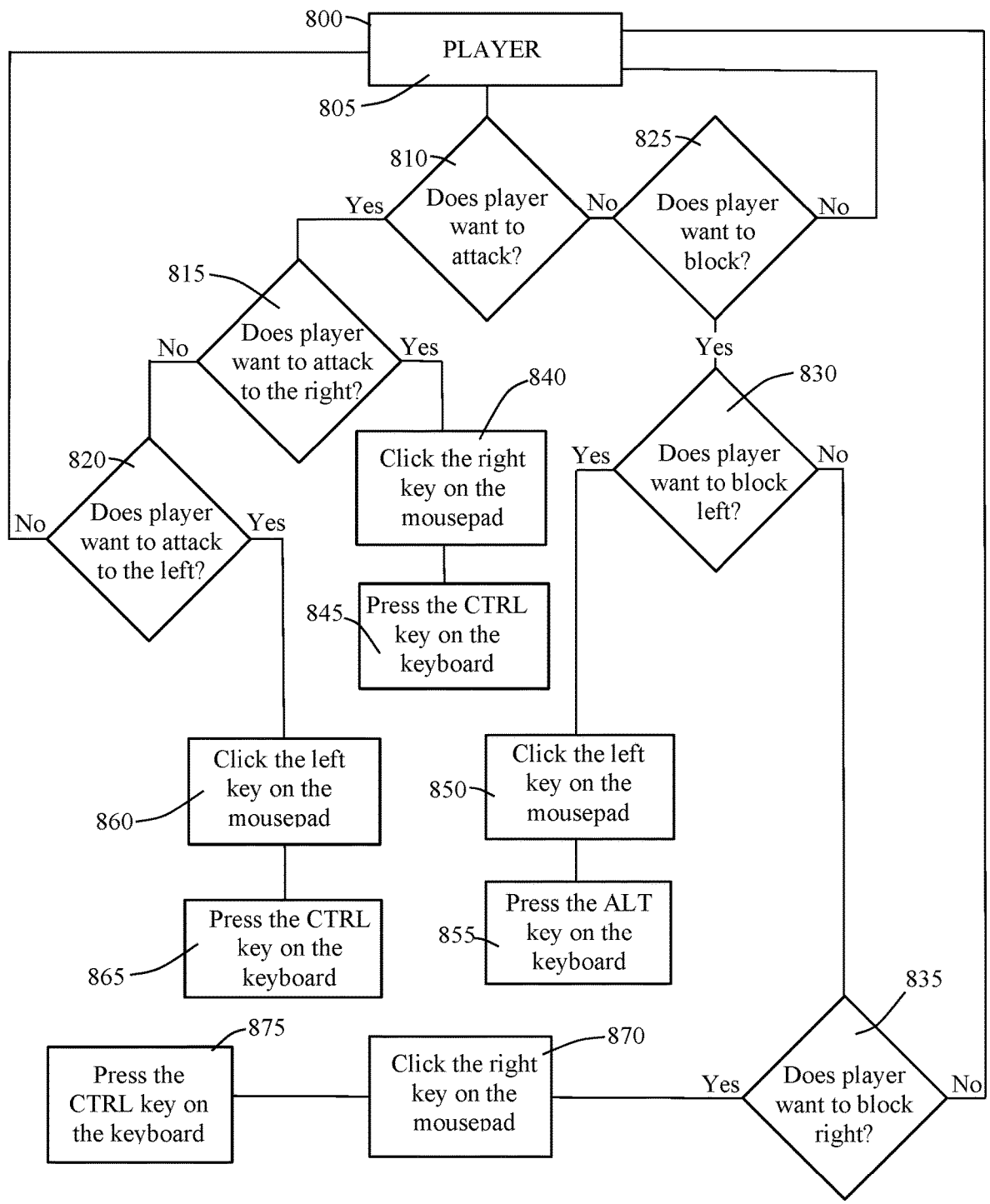
FIG. 30 is a flow chart showing the decisions a video game player makes in order to control a reticle of the present invention along with the associated actions.

Referring now to the preferred embodiment of the present invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30, a method for controlling a video game using a Video Game Reticle 100 is shown. FIG. 1 illustrates a reticle-dial swing signaler 110, which is a preferred embodiment of a Video Game Reticle 100. FIG. 2 depicts a line-arrow swing signaler 120, which is another preferred embodiment of a Video Game Reticle 100. FIG. 3 shows a line swing signaler 130, which is another preferred embodiment of a Video Game Reticle 100. FIG. 4 displays a modified line swing signaler 190, which is another preferred embodiment of a Video Game Reticle 100. FIG. 5 shows a sword swing signaler 140, which is the most preferred embodiment of a Video Game Reticle 100. FIG. 6 depicts a racket swing signaler 150, which is another preferred embodiment of a Video Game Reticle 100. FIG. 7 illustrates a diagram showing first person video game combat using a sword swing signaler 140 as a Video Game Reticle 100 to attack. FIG. 8 demonstrates a diagram showing first person video game combat using a sword swing signaler 140 as a Video Game Reticle 100 to defend. FIG. 9 shows a diagram illustrating third person video combat using a Video Game Reticle 100. FIG. 10 displays a diagram, which describes the motion of a sword swing signaler 140 in response to entered commands. FIG. 11 depicts a diagram, which describes the motion of a sword swing signaler 140 and of the corresponding sword object 168 that it controls, in response to entered commands. FIG. 12 shows a diagram, which describes the motion of a sword swing signaler 140 and of the corresponding sword object 168 that it controls, in response to entered commands. FIG. 13 illustrates a diagram, which describes the motion of a sword swing signaler 140 and of the corresponding sword object 168 that it controls, in response to entered commands. FIG. 14 demonstrates a diagram that describes the motion of a sword object 168, which acts as its own Video Game Reticle 100, in response to entered commands. FIG. 15 shows a diagram that describes the motion of a sword object 168, which acts as its own Video Game Reticle 100, in response to entered commands. FIG. 16 depicts a diagram that describes the motion of a sword object 168, which acts as its own Video Game Reticle 100, in response to entered commands. FIG. 17 displays a diagram, which describes the motion of a line-arrow swing signaler 120 in response to entered commands. FIG. 18 illustrates a diagram, which describes the motion of a line-arrow swing signaler 120 and of the corresponding sword object 168 that it controls, in response to entered commands. FIG. 19 shows a diagram, which describes the motion of a line-arrow swing signaler 120 and of the corresponding sword object 168 that it controls, in response to entered commands. FIG. 20 displays a diagram, which describes the motion of a line-arrow swing signaler 120 and of the corresponding sword object 168 that it controls, in response to entered commands. FIG. 21 demonstrates a diagram, which describes the motion of a line swing signaler 130 in response to entered commands. FIG. 22 displays a diagram, which describes the motion of a line swing signaler 130 and of the corresponding sword object 168 that it controls, in response to entered commands. FIG. 23 depicts a diagram, which describes the motion of a line swing signaler 130 and of the corresponding sword object 168 that it controls, in response to entered commands. FIG. 24 shows a diagram, which describes the motion of a line swing signaler 130 and of the corresponding sword object 168 that it controls, in response to entered commands. FIG. 25 demonstrates a diagram, which describes the motion of a modified line swing signaler 190 in response to entered commands. FIG. 26 displays a diagram, which describes the motion of a modified line swing signaler 190 and of the corresponding sword object 168 that it controls, in response to entered commands. FIG. 27 depicts a diagram, which describes the motion of a modified line swing signaler 190 and of the corresponding sword object 168 that it controls, in response to entered commands. FIG. 28 shows a diagram, which describes the motion of a modified line swing signaler 190 and of the corresponding sword object 168 that it controls, in response to entered commands. FIG. 29 illustrates a diagram that compares third person video game play to first person video game play. FIG. 30 shows a flow chart describing the decisions and actions a video game player makes in order to control a Video Game Reticle 100 along with an associated video game object.

Referring still to preferred embodiments of the present invention, in FIG. 1, FIG. 2, FIG. 3, FIG. 4, FIG. 5, and FIG. 6, examples of Video Game Reticles 100 used in the method of the present invention are shown. In FIG. 1, a reticle-dial swing signaler 110 is an embodiment of a Video Game Reticle 100, which comprises an animated graphical image comprising a reticle-dial pivot point 118, a reticle-dial hub 115 surrounding the reticle-dial pivot point 118, a reticle-dial pointer 116 that extends outward from the reticle-dial pivot point 118 and may rotate around the reticle-dial pivot point 118, a reticle-dial clockwise rotation indicator 112, and a reticle-dial counter-clockwise rotation indicator 114. During video game play, a player uses keyed controls to rotate the reticle-dial pointer 116 in the desired rotational direction around the reticle-dial pivot point 118 until the reticle-dial pointer 116 is pointed in a desired direction to initiate an action, and the player executes the action using other keyed controls. When an action is executed, the position of the reticle-dial pointer 116 relative to an optimal position for the action determines the effectiveness of the action so that the player experiences more nuanced game play. The reticle-dial clockwise rotation indicator 112 and reticle-dial counter-clockwise rotation indicator 114 indicate the direction of rotational motion and may or may not be displayed as part of a Video Game Reticle 100. One skilled in the art will understand that the reticle-dial pointer 116 may comprise any graphical image that is rotatable around a pivot point with a clear indication of a desired direction. In FIG. 2, a line-arrow swing signaler 120 is an embodiment of a Video Game Reticle 100, which comprises an animated graphical image comprising a line-arrow pivot point 125, a line-arrow pointer 126 that comprises a line segment 127 extending from one side of the player's viewing window through the line-arrow pivot point 125 and ending in an end point 128 and may rotate around the line-arrow pivot point 125, a line-arrow clockwise rotation indicator 122, and a line-arrow counter-clockwise rotation indicator 124. During video game play, a player uses keyed controls to rotate the line-arrow pointer 126 in the desired rotational direction around the line-arrow pivot point 125 until the line-arrow pointer 126 is pointed in a desired direction to initiate an action, and the player executes the action using other keyed controls. When an action is executed, the position of the line-arrow pointer 126 relative to an optimal position for the action determines the effectiveness of the action so that the player experiences more nuanced game play. The line-arrow clockwise rotation indicator 122 and line-arrow counter-clockwise rotation indicator 124 indicate the direction of rotational motion and may or may not be displayed as part of a Video Game Reticle 100. In FIG. 3, a line swing signaler 130 is an embodiment of a Video Game Reticle 100, which comprises an animated graphical image comprising a line pivot point 135, a line pointer 136 that comprises a line 137 extending from one side of the player's viewing window through the line pivot point 135 and to the opposite side of the player's viewing window and may rotate around the line pivot point 135, a line clockwise rotation indicator 132, and a line counter-clockwise rotation indicator 134. During video game play, a player uses keyed controls to rotate the line pointer 136 in the desired rotational direction around the line pivot point 135 until the line pointer 136 is aligned in a desired direction to initiate an action, and the player executes the action using other keyed controls. When an action is executed, the position of the line pointer 136 relative to an optimal position for the action determines the effectiveness of the action so that the player experiences more nuanced game play. The line clockwise rotation indicator 132 and line counter-clockwise rotation indicator 134 indicate the direction of rotational motion and may or may not be displayed as part of a Video Game Reticle 100. In FIG. 4, a modified line swing signaler 190 is an embodiment of a Video Game Reticle 100, which comprises an animated graphical image comprising a modified line pivot point 195, a modified line pointer 196 that comprises a modified line 191 extending from one side of the player's viewing window through the modified line pivot point 195 and to the opposite side of the player's viewing window with a first highlighted end 197 on one end of the modified line 191 and a second highlighted end 198 on the other end of the modified line 191 and may rotate around the modified line pivot point 195, a modified line clockwise rotation indicator 192, and a modified line counter-clockwise rotation indicator 194. During video game play, a player uses keyed controls to rotate the modified line pointer 196 in the desired rotational direction around the modified line pivot point 195 until the modified line pointer 196 is aligned in a desired direction to initiate an action, and the player executes the action using other keyed controls. With the modified line swing signaler 190 a player may also select the direction of the action along the modified line pointer 196 by using other keyed controls to select either the first highlighted end 197 or the second highlighted end 198, and the action is directed towards the selected highlighted end accordingly. When an action is executed, the position of the modified line pointer 196 relative to an optimal position for the action, as well as the direction of the action towards a first highlighted end 197 or second highlighted end 198, determines the effectiveness of the action so that the player experiences more nuanced game play. The modified line clockwise rotation indicator 192 and modified line counter-clockwise rotation indicator 194 indicate the direction of rotational motion and may or may not be displayed as part of a Video Game Reticle 100. In FIG. 5, a sword swing signaler 140 is the most preferred embodiment of a Video Game Reticle 100, which comprises an animated graphical image comprising a sword object pivot point 145, a sword object pointer 146 that substantially appears as a sword and may rotate around the sword object pivot point 145, a sword object clockwise rotation indicator 142, and a sword object counter-clockwise rotation indicator 144. During video game play, a player uses keyed controls to rotate the sword object pointer 146 in the desired rotational direction around the sword object pivot point 145 until the sword object pointer 146 is pointed in a desired direction to initiate an action, and the player executes the action using other keyed controls. When an action is executed, the position of the sword object pointer 146 relative to an optimal position for the action determines the effectiveness of the action so that the player experiences more nuanced game play. The sword object clockwise rotation indicator 142 and sword object counter-clockwise rotation indicator 144 indicate the direction of rotational motion and may or may not be displayed as part of a Video Game Reticle 100. One skilled in the art will understand that the sword object pointer 146 may comprise any graphical image of an object used in a video game that is rotatable around a pivot point with a clear indication of a desired direction and is not limited to the image of a sword. Similar Video Game Reticles 100 could be used for any video game object that is swung with varying effectiveness, including, but not limited to, a sword, axe, mace, knife, club, spear, whip, simulated handheld weapon, or the like. In FIG. 6, a racket swing signaler 150 is an embodiment of a Video Game Reticle 100, which comprises an animated graphical image comprising a racket object pivot point 155, a racket object pointer 156 that substantially appears as a racket and may rotate around the racket object pivot point 155, a racket object clockwise rotation indicator 152, and a racket object counter-clockwise rotation indicator 154. During video game play, a player uses keyed controls to rotate the racket object pointer 156 in the desired rotational direction around the racket object pivot point 155 until the racket object pointer 156 is pointed in a desired direction to initiate an action, and the player executes the action using other keyed controls. When an action is executed, the position of the racket object pointer 156 relative to an optimal position for the action determines the effectiveness of the action so that the player experiences more nuanced game play. The racket object clockwise rotation indicator 152 and racket object counter-clockwise rotation indicator 154 indicate the direction of rotational motion and may or may not be displayed as part of a Video Game Reticle 100. One skilled in the art will understand that the racket object pointer 156 may comprise any graphical image of an object used in a video game that is rotatable around a pivot point with a clear indication of a desired direction and is not limited to the image of a racket. Similar Video Game Reticles 100 could be used for any video game object that is swung with varying effectiveness, including, but not limited to, sports equipment, baseball bats, tennis rackets, golf clubs, or the like.

Referring still to preferred embodiments of the present invention, in FIG. 5, FIG. 7 and FIG. 8, examples of using the method of the present invention for first person video game play with a Video Game Reticle 100 are shown. In FIG. 7, a diagram shows a series of panels illustrating the use of a sword swing signaler 140 during an attack action. In the first attack panel 161, a first-person enemy 165 is holding an enemy sword 166, a first-person avatar 167 that is controlled by the player is holding a sword object 168, and a sword swing signaler 140 is displayed in the player's window pointing down. In the second attack panel 162, the player has initiated an attack action and the video game animates the action of the first-person avatar 167 raising the sword object 168 in alignment with the direction of the sword swing signaler 140. In the third attack panel 163, the video game animates the action of the first-person avatar 167 swinging the sword object 168 in the direction the sword swing signaler 140 is pointing and the first-person enemy 165 blocks the attack action with the enemy sword 166. The effectiveness of the attack action is determined by the position of the sword swing signaler 140 relative to an optimal position for the attack action for more nuanced game play. For example, if an attack action is executed with the sword swing signaler 140 positioned relatively far away from an optimal position for an attack, the attack will have diminished effectiveness and the video game simulates a glancing blow with little damage to the first-person enemy 165. As a contrary example, if an attack action is executed with the sword swing signaler 140 positioned at or close to an optimal position for an attack, the attack will have increased effectiveness and the video game simulates an effective blow with large amounts of damage to the first-person enemy 165. In the fourth attack panel 164, the attack action is complete and the first-person avatar 167 and first-person enemy 165 return to their initial positions before the attack action. In FIG. 8, a diagram shows a series of panels illustrating the use of a sword swing signaler 140 during a defense action. In the first defense panel 171, a first-person enemy 165 is holding an enemy sword 166, a first-person avatar 167 that is controlled by the player is holding a sword object 168, and a sword swing signaler 140 is displayed in the player's window. In the second defense panel 172, the first-person enemy 165 has initiated an attack action by raising the enemy sword 166, and the player rotates the sword swing signaler 140 to the desired direction, which is pointing to the right in this illustration. In the third defense panel 173, the video game animates the action of the first-person enemy 165 swinging the enemy sword 166 towards the first-person avatar 167, and the player executes a defense action whereby the video game animates the sword object 168 blocking the incoming enemy sword in alignment with the sword swing signaler 140. The effectiveness of the defense action is determined by the position of the sword swing signaler 140 relative to an optimal position for the defense action for more nuanced game play. For example, if a defense action is executed with the sword swing signaler 140 positioned relatively far away from an optimal position for a defense, the defense will have diminished effectiveness and the video game simulates damage to the first-person avatar 167. As a contrary example, if a defense action is executed with the sword swing signaler 140 positioned at or close to an optimal position for a defense, the defense will have increased effectiveness and the video game simulates a glancing blow with little or no damage to the first-person avatar 167. In the fourth defense panel 174, the defense action is complete and the first-person avatar 167 and first-person enemy 165 return to their initial positions before the defense action.

Referring still to preferred embodiments of the present invention, in FIG. 9, an example of using the method of the present invention for third person video game play with a Video Game Reticle 100 is shown. In FIG. 9, a diagram shows a series of panels illustrating the use of a Video Game Reticle 100 during attack actions. In the first third-person panel 181, a third-person avatar 187 that is controlled by the player is holding a third-person sword object 188, and a Video Game Reticle 100 is displayed in the player's window pointing to the upper right. In the second third-person panel 182, the player has executed an attack action, and the video game animates a third-person enemy 185 being stuck by the third-person sword object 188 in alignment with the direction of the Video Game Reticle 100 from first third-person panel 181 with the slash damage 189 to the third-person enemy 185 in alignment with the direction of the Video Game Reticle 100 from first third-person panel 181. In the third third-person panel 183, a third-person avatar 187 that is controlled by the player is holding a third-person sword object 188, and a Video Game Reticle 100 is displayed in the player's window pointing to the lower right. In the fourth third-person panel 184, the player has executed an attack action, and the video game animates a third-person enemy 185 being stuck by the third-person sword object 188 in alignment with the direction of the Video Game Reticle 100 from third third-person panel 183 with the slash damage 189 to the third-person enemy 185 in alignment with the direction of the Video Game Reticle 100 from third third-person panel 183. The effectiveness of the attack action is determined by the position of the Video Game Reticle 100, and its corresponding slash damage 189, relative to an optimal position for the attack action for more nuanced game play. For example, if an attack action is executed with the Video Game Reticle 100 positioned away from an optimal position for an attack, such that the slash damage 189 strikes an uncritical portion of a third-person enemy 185, the attack will have diminished effectiveness and the video game simulates little damage to the third-person enemy 185. As a contrary example, if an attack action is executed with the Video Game Reticle 100 positioned at or close to an optimal position for an attack, such that the slash damage 189 strikes a critical portion of a third-person enemy 185, the attack will have increased effectiveness and the video game simulates large amounts of damage to the third-person enemy 185.

Referring now to the most preferred embodiments of the present invention, in FIG. 5, FIG. 10, FIG. 11, FIG. 12, and FIG. 13, a series of panels are shown in diagrams that illustrate the reactions of a Video Game Reticle 100 in response to keyed commands by a player. In particular, FIG. 10, FIG. 11, FIG. 12, and FIG. 13, describe the behavior of a sword swing signaler 140. In these figures, the first column of panels indicates the state of a sword swing signaler 140, the second column of panels show examples of the corresponding key entries using a personal computer with a mouse 213 and keyboard, and the third column of panels show examples of the corresponding key entries using a video game controller 214. In FIG. 10, the first sword swing signaler panel 201 illustrates a sword swing signaler 140 version of a Video Game Reticle 100 inactive and by itself with the second sword swing signaler panel 202 showing an inactive mouse 213 and with the third sword swing signaler panel 203 showing an inactive video game controller 214. The fourth sword swing signaler panel 204 depicts a sword swing signaler 140 version of a Video Game Reticle 100 by itself and rotating counterclockwise (or to the left) in response to the player's actions with the fifth sword swing signaler panel 205 showing the mouse 213 being left-clicked 215 and with the sixth sword swing signaler panel 206 showing the video game controller 214 being L-1-clicked 217. The seventh sword swing signaler panel 207 displays a sword swing signaler 140 version of a Video Game Reticle 100 by itself and rotating clockwise (or to the right) in response to the player's actions with the eighth sword swing signaler panel 208 showing the mouse 213 being right-clicked 216 and with the ninth sword swing signaler panel 209 showing the video game controller 214 being R-1-clicked 218. The tenth sword swing signaler panel 210 illustrates a sword swing signaler 140 version of a Video Game Reticle 100 by itself and rotating counterclockwise (or to the left) in response to the player's actions with the eleventh sword swing signaler panel 211 showing the mouse 213 being left-clicked 215 and with the twelfth sword swing signaler panel 212 showing the video game controller 214 being L-1-clicked 217. In FIG. 11, the first sword swing signaler with object panel 221 illustrates an inactive sword swing signaler 140 version of a Video Game Reticle 100, along with the sword object 168 and first-person avatar 167 that it controls, with the second sword swing signaler with object panel 222 showing an inactive mouse 213 and with the third sword swing signaler with object panel 223 showing an inactive video game controller 214. The fourth sword swing signaler with object panel 224 depicts a sword swing signaler 140 version of a Video Game Reticle 100, along with the sword object 168 and first-person avatar 167 that it controls, rotating counterclockwise (or to the left) in response to the player's actions with the fifth sword swing signaler with object panel 225 showing the mouse 213 being left-clicked 215 and with the sixth sword swing signaler with object panel 226 showing the video game controller 214 being L-1-clicked 217. The seventh sword swing signaler with object panel 227 displays a sword swing signaler 140 version of a Video Game Reticle 100, along with the sword object 168 and first-person avatar 167 that it controls, rotating clockwise (or to the right) in response to the player's actions with the eighth sword swing signaler with object panel 228 showing the mouse 213 being right-clicked 216 and with the ninth sword swing signaler with object panel 229 showing the video game controller 214 being R-1-clicked 218. The tenth sword swing signaler with object panel 230 illustrates a sword swing signaler 140 version of a Video Game Reticle 100, along with the sword object 168 and first-person avatar 167 that it controls, rotating counterclockwise (or to the left) in response to the player's actions with the eleventh sword swing signaler with object panel 231 showing the mouse 213 being left-clicked 215 and with the twelfth sword swing signaler with object panel 232 showing the video game controller 214 being L-1-clicked 217. In FIG. 12, the first sword swing signaler first action panel 241 illustrates a sword swing signaler 140 version of a Video Game Reticle 100, along with the sword object 168 and first-person avatar 167 that it controls, with the second sword swing signaler first action panel 242 showing a mouse 213 and control key 233 of a personal computer keyboard and with the third sword swing signaler first action panel 243 showing a video game controller 214 being right-outer-clicked 235 to initiate an action. The fourth sword swing signaler first action panel 244 depicts a sword swing signaler 140 version of a Video Game Reticle 100, along with the sword object 168 and first-person avatar 167 that it controls, with the fifth sword swing signaler first action panel 245 showing the mouse 213 and the control key 233 being control-clicked 234 and with the sixth sword swing signaler first action panel 246 showing the video game controller 214 being left-outer-clicked 236. The seventh sword swing signaler first action panel 247 displays a sword swing signaler 140 version of a Video Game Reticle 100, along with the sword object 168 and first-person avatar 167 that it controls, with the sword object 168 initiating a swing to the left in response to the player's keyed actions with the eighth sword swing signaler first action panel 248 showing the mouse 213 and control key 233 being inactive after being released and with the ninth sword swing signaler first action panel 249 showing the video game controller 214 being inactive after being released. The tenth sword swing signaler first action panel 250 illustrates a sword swing signaler 140 version of a Video Game Reticle 100, along with the sword object 168 and first-person avatar 167 that it controls, with the sword object 168 swinging fully to the left in response to the player's keyed actions with the eleventh sword swing signaler first action panel 251 showing the mouse 213 being inactive after being released and with the twelfth sword swing signaler first action panel 252 showing the video game controller 214 being inactive after being released. In FIG. 13, the first sword swing signaler second action panel 261 illustrates a sword swing signaler 140 version of a Video Game Reticle 100, along with the sword object 168 swinging back to its initial position after a first action, the first-person avatar 167 that it controls, and with a first touch pad action 253 for optionally controlling the Video Game Reticle 100 using a touch screen, with the second sword swing signaler second action panel 262 showing a mouse 213, a control key 233, and a caps lock key 257 of a personal computer keyboard and with the third sword swing signaler second action panel 263 showing a video game controller 214. The fourth sword swing signaler second action panel 264 depicts a sword swing signaler 140 version of a Video Game Reticle 100 rotating clockwise (or to the right) in response to keyed commands from the player, along with the sword object 168, the first-person avatar 167 that it controls, and with a second touch pad action 254 for optionally controlling the Video Game Reticle 100 using a touch screen, with the fifth sword swing signaler second action panel 265 showing the mouse 213 being right-clicked 216 and the control key 233 and the caps lock key 257 and with the sixth sword swing signaler second action panel 266 showing the video game controller 214 being R-1-clicked 218 and right-inner-clicked 258. The seventh sword swing signaler second action panel 267 displays a sword swing signaler 140 version of a Video Game Reticle 100, along with the sword object 168 and first-person avatar 167 that it controls, with the sword object 168 lining up with the Video Game Reticle 100 in response to the player's keyed actions, and with a third touch pad action 255 for optionally controlling the Video Game Reticle 100 using a touch screen, with the eighth sword swing signaler second action panel 268 showing the mouse 213 and control key 233 being inactive and the caps lock key 257 being caps-lock-clicked 259 and with the ninth sword swing signaler second action panel 269 showing the video game controller 214 being left-inner-clicked 237. The tenth sword swing signaler second action panel 270 illustrates a sword swing signaler 140 version of a Video Game Reticle 100, along with the sword object 168 and first-person avatar 167 that it controls, and with a fourth touch pad action 256 for optionally controlling the Video Game Reticle 100 using a touch screen, with the eleventh sword swing signaler second action panel 271 showing the mouse 213, control key 233, and caps lock key 257 being inactive after being released and with the twelfth sword swing signaler second action panel 272 showing the video game controller 214 being inactive after being released.

Referring now to other preferred embodiments of the present invention, in FIG. 14, FIG. 15, and FIG. 16, a series of panels are shown in diagrams that illustrate the reactions of a Video Game Reticle 100 in response to keyed commands by a player. In particular, FIG. 14, FIG. 15, and FIG. 16, describe the behavior of a swing signaler that is also the object that it controls. In these figures, the first column of panels indicates the state of a sword object 168 that is also the Video Game Reticle 100, the second column of panels show examples of the corresponding key entries using a personal computer with a mouse 213 and keyboard, and the third column of panels show examples of the corresponding key entries using a video game controller 214. In FIG. 14, the first object swing signaler panel 301 illustrates a sword object 168 version of a Video Game Reticle 100 inactive along with a first person avatar 167 with the second object swing signaler panel 302 showing an inactive mouse 213 and with the third object swing signaler panel 303 showing an inactive video game controller 214. The fourth object swing signaler panel 304 depicts a sword object 168 version of a Video Game Reticle 100 rotating counterclockwise (or to the left) in response to the player's actions with the fifth object swing signaler panel 305 showing the mouse 213 being left-clicked 215 and with the sixth object swing signaler panel 306 showing the video game controller 214 being L-1-clicked 217. The seventh object swing signaler panel 307 displays a sword object 168 version of a Video Game Reticle 100 rotating clockwise (or to the right) in response to the player's actions with the eighth object swing signaler panel 308 showing the mouse 213 being right-clicked 216 and with the ninth object swing signaler panel 309 showing the video game controller 214 being R-1-clicked 218. The tenth object swing signaler panel 310 illustrates a sword object 168 version of a Video Game Reticle 100 rotating counterclockwise (or to the left) in response to the player's actions with the eleventh object swing signaler panel 311 showing the mouse 213 being left-clicked 215 and with the twelfth object swing signaler panel 312 showing the video game controller 214 being L-1-clicked 217. In FIG. 15, the first object swing signaler first action panel 321 illustrates a sword object 168 version of a Video Game Reticle 100, along with a first-person avatar 167, with the second object swing signaler first action panel 322 showing a mouse 213 and control key 233 of a personal computer keyboard and with the third object swing signaler first action panel 323 showing a video game controller 214 being right-outer-clicked 235 to initiate an action. The fourth object swing signaler first action panel 324 depicts a sword object 168 version of a Video Game Reticle 100, along with a first-person avatar, with the sword object swinging to the right with the fifth object swing signaler first action panel 325 showing the mouse 213 and the control key 233 being control-clicked 234 and with the sixth object swing signaler first action panel 326 showing the video game controller 214 being left-outer-clicked 236. The seventh object swing signaler first action panel 327 displays a sword object 168 version of a Video Game Reticle 100, along with a first-person avatar 167, with the sword object 168 swinging to the left in response to the player's keyed actions with the eighth object swing signaler first action panel 328 showing the mouse 213 and control key 233 being inactive after being released and with the ninth object swing signaler first action panel 329 showing the video game controller 214 being inactive after being released. The tenth object swing signaler first action panel 330 illustrates a sword object 168 version of a Video Game Reticle 100, along with a first-person avatar 167, with the sword object 168 swinging fully to the left in response to the player's keyed actions with the eleventh object swing signaler first action panel 331 showing the mouse 213 and control key 233 being inactive after being released and with the twelfth object swing signaler first action panel 332 showing the video game controller 214 being inactive after being released. In FIG. 16, the first object swing signaler second action panel 341 illustrates a sword object 168 version of a Video Game Reticle 100, along with a first-person avatar 167, with the second object swing signaler second action panel 342 showing a mouse 213, a control key 233, and a caps lock key 257 of a personal computer keyboard and with the third object swing signaler second action panel 343 showing a video game controller 214. The fourth object swing signaler second action panel 344 depicts a sword object 168 version of a Video Game Reticle 100 rotating clockwise (or to the right) in response to keyed commands from the player, along with a first-person avatar 167, with the fifth object swing signaler second action panel 345 showing the mouse 213 being right-clicked 216 and the control key 233 and the caps lock key 257 and with the sixth object swing signaler second action panel 346 showing the video game controller 214 being R-1-clicked 218 and right-inner-clicked 258. The seventh object swing signaler second action panel 347 displays a sword object 168 version of a Video Game Reticle 100, along with a first-person avatar 167 that it controls, in response to the player's keyed actions, with the eighth object swing signaler second action panel 348 showing the mouse 213 and control key 233 being inactive and the caps lock key 257 being caps-lock-clicked 259 and with the ninth object swing signaler second action panel 349 showing the video game controller 214 being left-inner-clicked 237. The tenth object swing signaler second action panel 350 illustrates a sword object 168 version of a Video Game Reticle 100, along with a first-person avatar 167, with the eleventh object swing signaler second action panel 351 showing the mouse 213, control key 233, and caps lock key 257 being inactive after being released and with the twelfth object swing signaler second action panel 352 showing the video game controller 214 being inactive after being released.

Referring now to other preferred embodiments of the present invention, in FIG. 2, FIG. 17, FIG. 18, FIG. 19, and FIG. 20, a series of panels are shown in diagrams that illustrate the reactions of a Video Game Reticle 100 in response to keyed commands by a player. In particular, FIG.

17, FIG. 18, FIG. 19, and FIG. 20, describe the behavior of a line-arrow swing signaler 120. In these figures, the first column of panels indicates the state of a line-arrow swing signaler 120, the second column of panels show examples of the corresponding key entries using a personal computer with a mouse 213 and keyboard, and the third column of panels show examples of the corresponding key entries using a video game controller 214. In FIG. 17, the first line-arrow swing signaler panel 401 illustrates a line-arrow swing signaler 120 version of a Video Game Reticle 100 inactive and by itself with the second line-arrow swing signaler panel 402 showing an inactive mouse 213 and with the third line-arrow swing signaler panel 403 showing an inactive video game controller 214. The fourth line-arrow swing signaler panel 404 depicts a line-arrow swing signaler 120 version of a Video Game Reticle 100 by itself and rotating counterclockwise (or to the left) in response to the player's actions with the fifth line-arrow swing signaler panel 405 showing the mouse 213 being left-clicked 215 and with the sixth line-arrow swing signaler panel 406 showing the video game controller 214 being L-1-clicked 217. The seventh line-arrow swing signaler panel 407 displays a line-arrow swing signaler 120 version of a Video Game Reticle 100 by itself and rotating clockwise (or to the right) in response to the player's actions with the eighth line-arrow swing signaler panel 408 showing the mouse 213 being right-clicked 216 and with the ninth line-arrow swing signaler panel 409 showing the video game controller 214 being R-1-clicked 218. The tenth line-arrow swing signaler panel 410 illustrates a line-arrow swing signaler 120 version of a Video Game Reticle 100 by itself and rotating counterclockwise (or to the left) in response to the player's actions with the eleventh line-arrow swing signaler panel 411 showing the mouse 213 being left-clicked 215 and with the twelfth line-arrow swing signaler panel 412 showing the video game controller 214 being L-1-clicked 217. In FIG. 18, the first line-arrow swing signaler with object panel 421 illustrates an inactive line-arrow swing signaler 120 version of a Video Game Reticle 100, along with the sword object 168 and first-person avatar 167 that it controls, with the second line-arrow swing signaler with object panel 422 showing an inactive mouse 213 and with the third line-arrow swing signaler with object panel 423 showing an inactive video game controller 214. The fourth line-arrow swing signaler with object panel 424 depicts a line-arrow swing signaler 120 version of a Video Game Reticle 100, along with the sword object 168 and first-person avatar 167 that it controls, rotating counterclockwise (or to the left) in response to the player's actions with the fifth line-arrow swing signaler with object panel 425 showing the mouse 213 being left-clicked 215 and with the sixth line-arrow swing signaler with object panel 426 showing the video game controller 214 being L-1-clicked 217. The seventh line-arrow swing signaler with object panel 427 displays a line-arrow swing signaler 120 version of a Video Game Reticle 100, along with the sword object 168 and first-person avatar 167 that it controls, rotating clockwise (or to the right) in response to the player's actions with the eighth line-arrow swing signaler with object panel 428 showing the mouse 213 being right-clicked 216 and with the ninth line-arrow swing signaler with object panel 429 showing the video game controller 214 being R-1-clicked 218. The tenth line-arrow swing signaler with object panel 230 illustrates a line-arrow swing signaler 120 version of a Video Game Reticle 100, along with the sword object 168 and first-person avatar 167 that it controls, rotating counterclockwise (or to the left) in response to the player's actions with the eleventh line-arrow swing signaler with object panel 231 showing the mouse 213 being left-clicked 215 and with the twelfth line-arrow swing signaler with object panel 232 showing the video game controller 214 being L-1-clicked 217. In FIG. 19, the first line-arrow swing signaler first action panel 441 illustrates a line-arrow swing signaler 120 version of a Video Game Reticle 100, along with the sword object 168 and first-person avatar 167 that it controls, with the second line-arrow swing signaler first action panel 442 showing a mouse 213 and control key 233 of a personal computer keyboard and with the third line-arrow swing signaler first action panel 443 showing a video game controller 214 being right-outer-clicked 235 to initiate an action. The fourth line-arrow swing signaler first action panel 444 depicts a line-arrow swing signaler 120 version of a Video Game Reticle 100, along with the sword object 168 and first-person avatar 167 that it controls, with the fifth line-arrow swing signaler first action panel 445 showing the mouse 213 and the control key 233 being control-clicked 234 and with the sixth line-arrow swing signaler first action panel 446 showing the video game controller 214 being left-outer-clicked 236. The seventh line-arrow swing signaler first action panel 447 displays a line-arrow swing signaler 120 version of a Video Game Reticle 100, along with the sword object 168 and first-person avatar 167 that it controls, with the sword object 168 initiating a swing to the left in response to the player's keyed actions with the eighth line-arrow swing signaler first action panel 448 showing the mouse 213 and control key 233 being inactive after being released and with the ninth line-arrow swing signaler first action panel 449 showing the video game controller 214 being inactive after being released. The tenth line-arrow swing signaler first action panel 450 illustrates a line-arrow swing signaler 120 version of a Video Game Reticle 100, along with the sword object 168 and first-person avatar 167 that it controls, with the sword object 168 swinging fully to the left in response to the player's keyed actions with the eleventh line-arrow swing signaler first action panel 451 showing the mouse 213 and control key 233 being inactive after being released and with the twelfth line-arrow swing signaler first action panel 452 showing the video game controller 214 being inactive after being released. In FIG. 20, the first line-arrow swing signaler second action panel 461 illustrates a line-arrow swing signaler 120 version of a Video Game Reticle 100, along with the sword object 168 swinging back to its initial position after a first action, the first-person avatar 167 that it controls, with the second line-arrow swing signaler second action panel 462 showing a mouse 213, a control key 233, and a caps lock key 257 of a personal computer keyboard and with the third line-arrow swing signaler second action panel 463 showing a video game controller 214. The fourth line-arrow swing signaler second action panel 464 depicts a line-arrow swing signaler 120 version of a Video Game Reticle 100 rotating clockwise (or to the right) in response to keyed commands from the player, along with the sword object 168 and the first-person avatar 167 that it controls, with the fifth line-arrow swing signaler second action panel 465 showing the mouse 213 being right-clicked 216 and the control key 233 and the caps lock key 257 and with the sixth line-arrow swing signaler second action panel 466 showing the video game controller 214 being R-1-clicked 218 and right-inner-clicked 258. The seventh line-arrow swing signaler second action panel 467 displays a line-arrow swing signaler 120 version of a Video Game Reticle 100, along with the sword object 168 and first-person avatar 167 that it controls, with the sword object 168 lining up with the line-arrow swing signaler 120 in response to the player's keyed actions, with the eighth line-arrow swing signaler second action panel 468 showing the mouse 213 and control key 233 being inactive and the caps lock key 257 being caps-lock-clicked 259 and with the ninth line-arrow swing signaler second action panel 469 showing the video game controller 214 being left-inner-clicked 237. The tenth line-arrow swing signaler second action panel 470 illustrates a line-arrow swing signaler 120 version of a Video Game Reticle 100, along with the sword object 168 and first-person avatar 167 that it controls, with the eleventh line-arrow swing signaler second action panel 471 showing the mouse 213, control key 233, and caps lock key 257 being inactive after being released and with the twelfth line-arrow swing signaler second action panel 472 showing the video game controller 214 being inactive after being released.

Referring now to other preferred embodiments of the present invention, in FIG. 3, FIG. 21, FIG. 22, FIG. 23, and FIG. 24, a series of panels are shown in diagrams that illustrate the reactions of a Video Game Reticle 100 in response to keyed commands by a player. In particular, FIG. 21, FIG. 22, FIG. 23, and FIG. 24, describe the behavior of a line swing signaler 130. In these figures, the first column of panels indicates the state of a line swing signaler 130, the second column of panels show examples of the corresponding key entries using a personal computer with a mouse 213 and keyboard, and the third column of panels show examples of the corresponding key entries using a video game controller 214. In FIG. 21, the first line-arrow swing signaler panel 501 illustrates a line swing signaler 130 version of a Video Game Reticle 100 inactive and by itself with the second line-arrow swing signaler panel 502 showing an inactive mouse 213 and with the third line-arrow swing signaler panel 503 showing an inactive video game controller 214. The fourth line-arrow swing signaler panel 504 depicts a line swing signaler 130 version of a Video Game Reticle 100 by itself and rotating counterclockwise (or to the left) in response to the player's actions with the fifth line-arrow swing signaler panel 505 showing the mouse 213 being left-clicked 215 and with the sixth line-arrow swing signaler panel 506 showing the video game controller 214 being L-1-clicked 217. The seventh line-arrow swing signaler panel 507 displays a line swing signaler 130 version of a Video Game Reticle 100 by itself and rotating clockwise (or to the right) in response to the player's actions with the eighth line-arrow swing signaler panel 508 showing the mouse 213 being right-clicked 216 and with the ninth line-arrow swing signaler panel 509 showing the video game controller 214 being R-1-clicked 218. The tenth line-arrow swing signaler panel 510 illustrates a line swing signaler 130 version of a Video Game Reticle 100 by itself and rotating counterclockwise (or to the left) in response to the player's actions with the eleventh line-arrow swing signaler panel 511 showing the mouse 213 being left-clicked 215 and with the twelfth line-arrow swing signaler panel 512 showing the video game controller 214 being L-1-clicked 217. In FIG. 22, the first line-arrow swing signaler with object panel 521 illustrates an inactive line swing signaler 130 version of a Video Game Reticle 100, along with the sword object 168 and first-person avatar 167 that it controls, with the second line-arrow swing signaler with object panel 522 showing an inactive mouse 213 and with the third line-arrow swing signaler with object panel 523 showing an inactive video game controller 214. With the line swing signaler 130 version of the Video Game Reticle 100, the object that the line swing signaler 130 controls, which is a sword object 168 in FIG. 22, visually lines up with the line swing signaler 130 and remains parallel to the line swing signaler 130 during rotation. The fourth line-arrow swing signaler with object panel 524 depicts a line swing signaler 130 version of a Video Game Reticle 100, along with the sword object 168 and first-person avatar 167 that it controls, rotating counterclockwise (or to the left) in response to the player's actions with the fifth line-arrow swing signaler with object panel 525 showing the mouse 213 being left-clicked 215 and with the sixth line-arrow swing signaler with object panel 526 showing the video game controller 214 being L-1-clicked 217. The seventh line-arrow swing signaler with object panel 527 displays a line swing signaler 130 version of a Video Game Reticle 100, along with the sword object 168 and first-person avatar 167 that it controls, rotating clockwise (or to the right) in response to the player's actions with the eighth line-arrow swing signaler with object panel 528 showing the mouse 213 being right-clicked 216 and with the ninth line-arrow swing signaler with object panel 529 showing the video game controller 214 being R-1-clicked 218. The tenth line-arrow swing signaler with object panel 530 illustrates a line swing signaler 130 version of a Video Game Reticle 100, along with the sword object 168 and first-person avatar 167 that it controls, rotating counterclockwise (or to the left) in response to the player's actions with the eleventh line-arrow swing signaler with object panel 531 showing the mouse 213 being left-clicked 215 and with the twelfth line-arrow swing signaler with object panel 532 showing the video game controller 214 being L-1-clicked 217. In FIG. 23, the first line-arrow swing signaler first action panel 541 illustrates a line swing signaler 130 version of a Video Game Reticle 100, along with the sword object 168 and first-person avatar 167 that it controls, with the second line-arrow swing signaler first action panel 542 showing a mouse 213 and control key 233 of a personal computer keyboard and with the third line-arrow swing signaler first action panel 543 showing a video game controller 214 being right-outer-clicked 235 to initiate an action. The fourth line-arrow swing signaler first action panel 544 depicts a line swing signaler 130 version of a Video Game Reticle 100, along with the sword object 168 and first-person avatar 167 that it controls, with the sword object 168 swinging to the right in response to the player's keyed actions at the beginning of the action with the fifth line-arrow swing signaler first action panel 545 showing the mouse 213 and the control key 233 being control-clicked 234 and with the sixth line-arrow swing signaler first action panel 546 showing the video game controller 214 being left-outer-clicked 236. The seventh line-arrow swing signaler first action panel 547 displays a line swing signaler 130 version of a Video Game Reticle 100, along with the sword object 168 and first-person avatar 167 that it controls, with the sword object 168 swinging to the left in the middle of the action with the eighth line-arrow swing signaler first action panel 548 showing the mouse 213 and control key 233 being inactive after being released and with the ninth line-arrow swing signaler first action panel 549 showing the video game controller 214 being inactive after being released. The tenth line-arrow swing signaler first action panel 550 illustrates a line swing signaler 130 version of a Video Game Reticle 100, along with the sword object 168 and first-person avatar 167 that it controls, with the sword object 168 swinging fully to the left with the eleventh line-arrow swing signaler first action panel 551 showing the mouse 213 and control key 233 being inactive after being released and with the twelfth line-arrow swing signaler first action panel 552 showing the video game controller 214 being inactive after being released. In FIG. 24, the first line-arrow swing signaler second action panel 561 illustrates a line swing signaler 130 version of a Video Game Reticle 100, along with the sword object 168 swinging back to its initial position after a first action, the first-person avatar 167 that it controls, with the second line-arrow swing signaler second action panel 562 showing a mouse 213, a control key 233, and a caps lock key 257 of a personal computer keyboard and with the third line-arrow swing signaler second action panel 563 showing a video game controller 214. The fourth line-arrow swing signaler second action panel 564 depicts a line swing signaler 130 version of a Video Game Reticle 100 rotating clockwise (or to the right) in response to keyed commands from the player, along with the sword object 168 and the first-person avatar 167 that it controls, with the fifth line-arrow swing signaler second action panel 565 showing the mouse 213 being right-clicked 216 and the control key 233 and the caps lock key 257 and with the sixth line-arrow swing signaler second action panel 566 showing the video game controller 214 being R-1-clicked 218 and right-inner-clicked 258. The seventh line-arrow swing signaler second action panel 567 displays a line swing signaler 130 version of a Video Game Reticle 100, along with the sword object 168 and first-person avatar 167 that it controls, with the sword object 168 lining up with the line swing signaler 130 in response to the player's keyed actions, with the eighth line-arrow swing signaler second action panel 568 showing the mouse 213 and control key 233 being inactive and the caps lock key 257 being caps-lock-clicked 259 and with the ninth line-arrow swing signaler second action panel 569 showing the video game controller 214 being left-inner-clicked 237. The tenth line-arrow swing signaler second action panel 570 illustrates a line swing signaler 130 version of a Video Game Reticle 100, along with the sword object 168 and first-person avatar 167 that it controls, with the eleventh line-arrow swing signaler second action panel 571 showing the mouse 213, control key 233, and caps lock key 257 being inactive after being released and with the twelfth line-arrow swing signaler second action panel 572 showing the video game controller 214 being inactive after being released.

Referring now to other preferred embodiments of the present invention, in FIG. 4, FIG. 25, FIG. 26, FIG. 27, and FIG. 28, a series of panels are shown in diagrams that illustrate the reactions of a Video Game Reticle 100 in response to keyed commands by a player. In particular, FIG. 25, FIG. 26, FIG. 27, and FIG. 28, describe the behavior of a modified line swing signaler 190. In these figures, the first column of panels indicates the state of a modified line swing signaler 190, the second column of panels show examples of the corresponding key entries using a personal computer with a mouse 213 and keyboard, and the third column of panels show examples of the corresponding key entries using a video game controller 214. In FIG. 25, the first line-arrow swing signaler panel 601 illustrates a modified line swing signaler 190 version of a Video Game Reticle 100 inactive, with the first highlighted end 197 and second highlighted end 198 both unselected, and by itself with the second line-arrow swing signaler panel 602 showing an inactive mouse 213 and with the third line-arrow swing signaler panel 603 showing an inactive video game controller 214. The fourth line-arrow swing signaler panel 604 depicts a modified line swing signaler 190 version of a Video Game Reticle 100 by itself, with the first highlighted end 197 and second highlighted end 198 both unselected, and rotating counterclockwise (or to the left) in response to the player's actions with the fifth line-arrow swing signaler panel 605 showing the mouse 213 being left-clicked 215 and with the sixth line-arrow swing signaler panel 606 showing the video game controller 214 being L-1-clicked 217. The seventh line-arrow swing signaler panel 607 displays a modified line swing signaler 190 version of a Video Game Reticle 100 by itself, with the first highlighted end 197 and second highlighted end 198 both unselected, and rotating clockwise (or to the right) in response to the player's actions with the eighth line-arrow swing signaler panel 608 showing the mouse 213 being right-clicked 216 and with the ninth line-arrow swing signaler panel 609 showing the video game controller 214 being R-1-clicked 218. The tenth line-arrow swing signaler panel 610 illustrates a modified line swing signaler 190 version of a Video Game Reticle 100 by itself, with the first highlighted end 197 and second highlighted end 198 both unselected, and rotating counterclockwise (or to the left) in response to the player's actions with the eleventh line-arrow swing signaler panel 611 showing the mouse 213 being left-clicked 215 and with the twelfth line-arrow swing signaler panel 612 showing the video game controller 214 being L-1-clicked 217. In FIG. 26, the first line-arrow swing signaler with object panel 621 illustrates an inactive modified line swing signaler 190 version of a Video Game Reticle 100 with the first highlighted end 197 and second highlighted end 198 both unselected, along with the sword object 168 and first-person avatar 167 that it controls, with the second line-arrow swing signaler with object panel 622 showing an inactive mouse 213 and with the third line-arrow swing signaler with object panel 623 showing an inactive video game controller 214. The fourth line-arrow swing signaler with object panel 624 depicts a modified line swing signaler 190 version of a Video Game Reticle 100 with the first highlighted end 197 and second highlighted end 198 both unselected, along with the sword object 168 and first-person avatar 167 that it controls, rotating counterclockwise (or to the left) in response to the player's actions with the fifth line-arrow swing signaler with object panel 625 showing the mouse 213 being left-clicked 215 and with the sixth line-arrow swing signaler with object panel 626 showing the video game controller 214 being L-1-clicked 217. The seventh line-arrow swing signaler with object panel 627 displays a modified line swing signaler 190 version of a Video Game Reticle 100 with the first highlighted end 197 and second highlighted end 198 both unselected, along with the sword object 168 and first-person avatar 167 that it controls, rotating clockwise (or to the right) in response to the player's actions with the eighth line-arrow swing signaler with object panel 628 showing the mouse 213 being right-clicked 216 and with the ninth line-arrow swing signaler with object panel 629 showing the video game controller 214 being R-1-clicked 218. The tenth line-arrow swing signaler with object panel 630 illustrates a modified line swing signaler 190 version of a Video Game Reticle 100 with the first highlighted end 197 and second highlighted end 198 both unselected, along with the sword object 168 and first-person avatar 167 that it controls, rotating counterclockwise (or to the left) in response to the player's actions with the eleventh line-arrow swing signaler with object panel 631 showing the mouse 213 being left-clicked 215 and with the twelfth line-arrow swing signaler with object panel 632 showing the video game controller 214 being L-1-clicked 217. In FIG. 27, the first line-arrow swing signaler first action panel 641 illustrates a modified line swing signaler 190 version of a Video Game Reticle 100, along with the sword object 168 and first-person avatar 167 that it controls, with the first highlighted end 197 unselected and second highlighted end 198 highlight selected 199 in response to player input, with the second line-arrow swing signaler first action panel 642 showing a mouse 213 and a control key 233, a Z key 675, and an X key 676 being X-key-clicked 677 to select the second highlighted end 198 to be highlight selected 199, of a personal computer keyboard and with the third line-arrow swing signaler first action panel 643 showing a video game controller 214 being right-outer-clicked 235 to initiate an action. The fourth line-arrow swing signaler first action panel 644 depicts a modified line swing signaler 190 version of a Video Game Reticle 100, along with the sword object 168 and first-person avatar 167 that it controls, with the first highlighted end 197 unselected and second highlighted end 198 highlight selected 199 in response to player input, with the sword object 168 swinging to the right in response to the player's keyed actions at the beginning of the action with the fifth line-arrow swing signaler first action panel 645 showing the mouse 213, the control key 233 being control-clicked 234, the Z key 675, and the X key 676 and with the sixth line-arrow swing signaler first action panel 646 showing the video game controller 214 being left-outer-clicked 236. The seventh line-arrow swing signaler first action panel 647 displays a modified line swing signaler 190 version of a Video Game Reticle 100, along with the sword object 168 and first-person avatar 167 that it controls, with the first highlighted end 197 unselected and second highlighted end 198 highlight selected 199 in response to player input, with the sword object 168 swinging to the right towards the highlight selected 199 end in the middle of the action with the eighth line-arrow swing signaler first action panel 648 showing the mouse 213, control key 233, the Z key 675, and the X key 676, being inactive after being released and with the ninth line-arrow swing signaler first action panel 649 showing the video game controller 214 being inactive after being released. The tenth line-arrow swing signaler first action panel 650 illustrates a modified line swing signaler 190 version of a Video Game Reticle 100, along with the sword object 168 and first-person avatar 167 that it controls, with the first highlighted end 197 unselected and second highlighted end 198 highlight selected 199 in response to player input, with the sword object 168 swinging fully to the right towards the highlight selected 199 end with the eleventh line-arrow swing signaler first action panel 651 showing the mouse 213, control key 233, the Z key 675, and the X key 676, being inactive after being released and with the twelfth line-arrow swing signaler first action panel 652 showing the video game controller 214 being inactive after being released. In FIG. 28, the first line-arrow swing signaler second action panel 661 illustrates a modified line swing signaler 190 version of a Video Game Reticle 100, along with the sword object 168 and first-person avatar 167 that it controls, with the first highlighted end 197 and second highlighted end 198 both unselected, with the second line-arrow swing signaler second action panel 662 showing a mouse 213, a control key 233, a Z key 675, an X key 676, and a caps lock key 257 of a personal computer keyboard all unselected and with the third line-arrow swing signaler second action panel 663 showing an inactive video game controller 214. The fourth line-arrow swing signaler second action panel 664 depicts a modified line swing signaler 190 version of a Video Game Reticle 100 rotating clockwise (or to the right) in response to keyed commands from the player, along with the sword object 168 and the first-person avatar 167 that it controls, with the first highlighted end 197 highlight selected 199 and second highlighted end 198 unselected in response to player input, with the fifth line-arrow swing signaler second action panel 665 showing the mouse 213 being right-clicked 216, the control key 233, the Z key 675 being Z-key-clicked 678 to select the first highlighted end 197 to be highlight selected 199, the X key 676, and the caps lock key 257 and with the sixth line-arrow swing signaler second action panel 666 showing the video game controller 214 being R-1-clicked 218 and right-inner-clicked 258. The seventh line-arrow swing signaler second action panel 667 displays a modified line swing signaler 190 version of a Video Game Reticle 100, along with the sword object 168 and first-person avatar 167 that it controls, with the first highlighted end 197 highlight selected 199 and second highlighted end 198 unselected in response to player input, with the sword object 168 lining up with the modified line swing signaler 190 and pointed in the direction of the highlight selected 199 first highlighted end 197, with the eighth line-arrow swing signaler second action panel 668 showing the mouse 213, the control key 233, the Z key 675, and the X key 676, being inactive and the caps lock key 257 being caps-lock-clicked 259 and with the ninth line-arrow swing signaler second action panel 669 showing the video game controller 214 being left-inner-clicked 237. The tenth line-arrow swing signaler second action panel 670 illustrates a modified line swing signaler 190 version of a Video Game Reticle 100, along with the sword object 168 swinging back to its initial position at the beginning of the action with the first-person avatar 167, with the first highlighted end 197 and second highlighted end 198 both unselected, with the eleventh line-arrow swing signaler second action panel 671 showing the mouse 213, control key 233, the Z key 675, the X key 676, and caps lock key 257 being inactive after being released and with the twelfth line-arrow swing signaler second action panel 672 showing the video game controller 214 being inactive after being released.

Referring now to the preferred embodiments of the present invention shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30, in FIG. 29 a diagram is depicted, which compares a first-person player experience to a third-person player experience. In FIG. 29, the third-person panel 701 shows a third-person avatar 187 holding a third-person sword object 188 with the Video Game Reticle 100 shown as a line before the third-person avatar 187 and with a virtual camera indicating the third-person source 710 of the point of view of third-person player experience showing the third-person field of view 715. The first-person panel 702 shows a first-person avatar 167 holding a sword object 168 with the Video Game Reticle 100 shown as a line before the first-person avatar 167, and the first-person avatar 167 is the first-person source 720 of the point of view of first-person player experience as shown with the first-person field of view 725. One skilled in the art will understand that the Video Game Reticle of the present invention may be easily adapted to either first-person or third person play, and the keyed controls indicated in the figures can apply to either type of gameplay.

Referring still to the preferred embodiments of the present invention depicted in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30, in FIG. 30 a Video Game Reticle flow chart 800 is shown, which describes the decision making and actions performed by a player using a Video Game Reticle 100. The process begins with the player begins step 805. First, the player decides whether to attack in the attack decision step 810. If the player wants to attack, the player must decide whether to attack to the right in the right attack decision step 815. If the player wants to attack to the right, the player clicks on the right mouse key in the click right mousepad key attack step 840. Next, the player clicks the control key on the keyboard in the right attack control step 845. If the player does not want to attack to the right, the player must decide whether to attack to the left in the left attack decision step 820. If the player wants to attack to the left, the player clicks on the left mouse key in the click left mousepad key attack step 860. Next, the player clicks the control key on the keyboard in the left attack control step 865. If the player does not want to attack to the left, the player returns to the player begins step 805. If the player does not want to attack, the player must decide whether to block in the block decision step 825. If the player does not want to block, the player returns to the player begins step 805. If the player does want to block, the player must decide whether to block to the left in the left block decision step 830. If the player wants to block to the left, the player clicks on the left mouse key in the click left mousepad key block step 850. Next, the player clicks the ALT key on the keyboard in the left block control step 855. If the player does not want to block to the left, the player must decide whether to block to the right in the right block decision step 835. If the player wants to block to the right, the player clicks on the right mouse key in the click right mousepad key block step 870. Next, the player clicks the control key on the keyboard in the right block control step 875. If the player does not want to block to the right, the player returns to the player begins step 805.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30, are as follows. The preferred embodiments of the Video Game Reticles 100 are animated, dynamic graphical symbols that comprise a series of instructions executable by a computer, which are stored in non-transitory computer-readable medium, such as software, algorithms, or the like. The Video Game Reticle 100 can be used in a video game dedicated to its use, or could be incorporated into an Application Programming Interface (API) to enable the Video Game Reticle 100 to be imported, adapted, or combined, with existing or third-party first-person or third person video game to enable them more nuanced control and effectiveness of virtual handheld objects. Although specific key input is associated with the preferred embodiments described in this application, one or ordinary skill in the art will understand that the Video Game Reticle 100 could use any combination of keyed input to control the reticle and that the Video Game Reticle can be adapted to various form of computer input in addition to the mouse, keyboard, touch pad, and controller used in the figures. The materials listed herein are examples only and not intended to limit the scope of the present invention.

The advantages of the present invention include, without limitation, that it provides methods that allow a player to enjoy improved nuanced control over simulated objects, as well as, nuanced effectiveness of a virtual action based on that nuanced control, in order to provide a more realistic experience in a video game. Additionally, the more nuanced control enabled by this invention allow a player to hone a more expansive set of skills and display their ability to enact complex and dynamic actions.

In broad embodiment, the present invention relates generally to a method for controlling a simulated tool or weapon in a first-person or third-person video game, such as a virtual sword, using a rotatable reticle, which allows a player to control the precise angle of an action and to select from a variety of actions, and then adjusts the effectiveness of the action based on the quality of the players use of the reticle.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. A method of nuanced control of an action in a video game, said method comprising:
   providing a processor, said processor being capable of controlling said video game;
   providing a display device, said display device being capable of being controlled by said processor;
   providing an input device, said input device being capable of providing player input information to said processor;
   providing a simulated video game object for manipulation in said video game, said simulated video game object being capable of being displayed on said display device in said video game using said processor and being capable of being manipulated by said input device using said processor;
   graphically illustrating a reticle in said video game on said display device using said processor, said reticle comprising
      a pivot point, and
      a directional indicator, said direction indicator being rotational around said pivot point based on said player input information from said input device using said processor and comprising a pointer;
   rotating said directional indicator around said pivot point displayed on said display device until said pointer is at a selected orientation in response to said player input information using said processor, said selected orientation comprising the orientation of said pointer selected by said player using said input device;
   initiating said action in response to said player input information using said processor;
   determining the effectiveness of said action by comparing said selected orientation to an optimal orientation using said processor, said optimal orientation comprising the orientation for optimizing said action, and reducing said effectiveness proportionately to the degree of variance of said selected orientation from said optimal orientation using said processor;
   configuring said action with said effectiveness using said processor; and
   simulating said action in said video game by displaying said action on said display device using said processor.

2. The method of claim 1, wherein said reticle changes colors based on said effectiveness of said action.

3. The method of claim 1, wherein said reticle resembles a handheld weapon.

4. The method of claim 1, wherein said reticle resembles hand-held sports equipment.

5. A method of nuanced control of an action in a video game, said method comprising:
   providing a processor, said processor being capable of controlling said video game;

providing a display device, said display device being capable of being controlled by said processor;
providing an input device, said input device being capable of providing player input information to said processor;
providing a simulated video game object for manipulation in said video game, said simulated video game object being capable of being displayed on said display device in said video game using said processor and being capable of being manipulated by said input device using said processor;
graphically illustrating said simulated video game object in said video game on said display device using said processor, said simulated video game object comprising
a pivot point, and
a directional indicator, said direction indicator being rotational around said pivot point based on said player input information from said input device using said processor and comprising a pointer;
rotating said directional indicator around said pivot point displayed on said display device until said pointer is at a selected orientation in response to said player input information using said processor, said selected orientation comprising the orientation of said pointer selected by said player using said input device;
initiating said action in response to said player input information using said processor;
determining the effectiveness of said action by comparing said selected orientation to an optimal orientation using said processor, said optimal orientation comprising the orientation for optimizing said action, and reducing said effectiveness proportionately to the degree of variance of said selected orientation from said optimal orientation using said processor;
configuring said action with said effectiveness using said processor; and
simulating said action in said video game by displaying said action on said display device using said processor.

6. The method of claim 5, wherein said simulated video game object changes colors based on said effectiveness of said action.

7. The method of claim 5, wherein said simulated video game object resembles a hand-held weapon.

8. The method of claim 5, wherein said simulated video game object resembles hand-held sports equipment.

9. A method of nuanced control of an action in a video game, said video game comprising a viewing window, said method comprising:
providing a processor, said processor being capable of controlling said video game;
providing a display device, said display device being capable of being controlled by said processor;
providing an input device, said input device being capable of providing player input information to said processor;
providing a simulated video game object for manipulation in said video game, said simulated video game object being capable of being displayed on said display device in said video game using said processor and being capable of being manipulated by said input device using said processor;
graphically illustrating a pointing line in said viewing window of said video game on said display device using said processor, said pointing line comprising
a pivot point,
a line extending from the edge of said viewing window of said video game through said pivot point, said line being rotational around said pivot point based on said player input information from said input device using said processor, and
a directional indicator, said direction indicator comprising a pointer;
rotating said line around said pivot point displayed on said display device until said pointer is at a selected orientation in response to said player input information using said processor, said selected orientation comprising the orientation of said pointer selected by said player using said input device;
initiating said action in response to said player input information using said processor;
determining the effectiveness of said action by comparing said selected orientation to an optimal orientation using said processor, said optimal orientation comprising the orientation for optimizing said action, and reducing said effectiveness proportionately to the degree of variance of said selected orientation from said optimal orientation using said processor;
configuring said action with said effectiveness using said processor; and
simulating said action in said video game by displaying said action on said display device using said processor.

10. The method of claim 9, wherein said pointing line changes colors based on said effectiveness of said action.

11. A method of nuanced control of an action in a video game, said video game comprising a viewing window, said method comprising:
providing a processor, said processor being capable of controlling said video game;
providing a display device, said display device being capable of being controlled by said processor;
providing an input device, said input device being capable of providing player input information to said processor;
providing a simulated video game object for manipulation in said video game, said simulated video game object being capable of being displayed on said display device in said video game using said processor and being capable of being manipulated by said input device using said processor;
graphically illustrating a control line in said viewing window of said video game on said display device using said processor, said control line comprising
a pivot point, and
a line extending from the edge of said viewing window of said video game through said pivot point to the opposite edge of said viewing window, said line being rotational around said pivot point based on said player input information from said input device using said processor;
rotating said line around said pivot point displayed on said display device until said line is at a selected orientation in response to said player input information using said processor, said selected orientation comprising the orientation of said line selected by said player using said input device;
initiating said action in response to said player input information using said processor;
determining the effectiveness of said action by comparing said selected orientation to an optimal orientation using said processor, said optimal orientation comprising the orientation for optimizing said action, and reducing said effectiveness proportionately to the degree of variance of said selected orientation from said optimal orientation using said processor;

configuring said action with said effectiveness using said processor; and simulating said action in said video game by displaying said action on said display device using said processor.

12. The method of claim 11, wherein said control line changes colors based on said effectiveness of said action.

13. A method of nuanced control of an action in a video game, said video game comprising a viewing window, said method comprising:

providing a processor, said processor being capable of controlling said video game;

providing a display device, said display device being capable of being controlled by said processor;

providing an input device, said input device being capable of providing player input information to said processor;

providing a simulated video game object for manipulation in said video game, said simulated video game object being capable of being displayed on said display device in said video game using said processor and being capable of being manipulated by said input device using said processor;

graphically illustrating a control line in said viewing window of said video game on said display device using said processor, said control line comprising a pivot point, a line extending from one edge of said viewing window of said video game through said pivot point to the opposite edge of said viewing window, said line being rotational around said pivot point based on said player input information from said input device using said processor, and two selectable ends on either end of said line, either said selectable end being able to be selected in response to said player input information from said input device using said processor;

rotating said line around said pivot point displayed on said display device until said line is at a selected orientation in response to said player input information using said processor, said selected orientation comprising the orientation of said line selected by said player using said input device;

selecting one said selectable end in response to said player input information using said processor, said selected selectable end determining the selected direction of said action;

initiating said action in response to said player input information using said processor;

determining the effectiveness of said action by comparing said selected orientation to an optimal orientation using said processor, said optimal orientation comprising the orientation for optimizing said action;

comparing said selected direction to an optimal direction using said processor, said optimal direction comprising the direction for optimizing said action; and reducing said effectiveness proportionately to the degree of variance of said selected orientation from said optimal orientation and the variance of said selected direction from said optimal direction using said processor;

configuring said action with said effectiveness using said processor; and simulating said action in said video game by displaying said action on said display device using said processor.

14. The method of claim 13, wherein said control line changes colors based on said effectiveness of said action.

* * * * *